(12) United States Patent
Seal

(10) Patent No.: US 6,452,504 B1
(45) Date of Patent: Sep. 17, 2002

(54) SYSTEM AND METHOD FOR COMMUNICATION WITH RADIO FREQUENCY IDENTIFICATION TAGS USING TOW MESSAGE DFM PROTOCOL

(75) Inventor: James Seal, Boca Raton, FL (US)

(73) Assignee: GE Interlogix, Inc., Austin, TX (US)

( * ) Notice: Subject to any disclaimer, the term of this patent is extended or adjusted under 35 U.S.C. 154(b) by 0 days.

(21) Appl. No.: 09/405,358

(22) Filed: Sep. 24, 1999

(51) Int. Cl.[7] .................................................. G08B 5/22

(52) U.S. Cl. .............................. 340/825.49; 340/572.2; 343/742

(58) Field of Search .......................... 340/825.49, 10.33, 340/10.34, 572.4, 572.7, 572.8, 10.4, 652, 572.1, 572.2; 342/42, 43; 343/742, 867

(56) References Cited

U.S. PATENT DOCUMENTS

| | | |
|---|---|---|
| 3,697,996 A | 10/1972 | Elder et al. |
| 3,938,125 A | 2/1976 | Benassi |
| 4,679,046 A | 7/1987 | Curtis et al. |
| 5,068,654 A | 11/1991 | Husher |
| 5,189,397 A | 2/1993 | Watkins et al. |
| 5,245,346 A * | 9/1993 | Nishimura et al. ........... 342/42 |
| 5,258,766 A | 11/1993 | Murdoch .................... 343/742 |
| 5,450,492 A | 9/1995 | Hook et al. |
| 5,453,747 A | 9/1995 | D'Hont et al. ................ 342/42 |
| 5,467,084 A | 11/1995 | Alofs et al. .................. 340/933 |
| 5,491,715 A | 2/1996 | Flaxl |
| 5,495,229 A * | 2/1996 | Balch et al. ............. 340/572.4 |
| 5,533,058 A | 7/1996 | Kady et al. |
| 5,541,604 A | 7/1996 | Meier |
| 5,572,226 A | 11/1996 | Tuttle |
| 5,594,448 A | 1/1997 | d'Hont |
| 5,608,406 A | 3/1997 | Eberth et al. |
| 5,629,981 A | 5/1997 | Nerlikar |
| 5,648,765 A * | 7/1997 | Cresap et al. .............. 340/10.4 |
| 5,689,242 A * | 11/1997 | Sims et al. .................. 340/652 |
| 5,708,423 A | 1/1998 | Ghaffari et al. |

(List continued on next page.)

FOREIGN PATENT DOCUMENTS

| | | |
|---|---|---|
| DE | 197 45 953 A1 | 4/1997 |
| EP | 0 733 916 A2 | 9/1996 |
| EP | 0 851 239 A1 | 7/1998 |
| EP | 0 892 358 A2 | 1/1999 |
| EP | 0 908 838 A2 | 4/1999 |
| EP | 0 919 971 A2 | 6/1999 |
| GB | 2 215 933 A | 9/1989 |
| WO | WO 94/00830 | 1/1994 |

OTHER PUBLICATIONS www.deister.com/hst.htm webpage, printed on Jul. 7, 1999 (2 pages).

Bursky, Dave, Talking over rf links, micropower ICs transfer data and status, *Electronic Design*, Aug. 25, 1988, pp. 51–56.

Primary Examiner—Michael Horabik
Assistant Examiner—William Bangachon
(74) Attorney, Agent, or Firm—Knobbe, Martens, Olson & Bear, LLP

(57) ABSTRACT

The system comprises a plurality of stationary sensors located in an array within certain physical areas. Each sensor comprises a plurality of antenna coils arranged in unique physical orientations and capable of transmitting radio frequency signals of differing phase. The RFID transponder includes an antenna which receives the signals generated by the antenna coils, and compares the phase of at least two of the signals to determined the relative position of the transponder. The antenna coils may emit two direction finding mode (DFM) signals in succession; the first signal with all antenna coils turned on, the second with a subset of the coils turned off. The spatial relationship of the transponder antenna and individual antenna coils precludes all of the signals in each sensor from being rejected by the transponder during emission of both the first and second DFM signal.

13 Claims, 23 Drawing Sheets

U.S. PATENT DOCUMENTS

| | | |
|---|---|---|
| 5,751,570 A | 5/1998 | Stobbe et al. |
| 5,850,187 A | 12/1998 | Carrender et al. |
| 5,874,896 A | 2/1999 | Lowe et al. .............. 340/572 |
| 5,923,300 A | 7/1999 | Mejia .................... 343/788 |
| 5,963,144 A | 10/1999 | Kruest |
| 6,054,935 A | 4/2000 | Urbas et al. .............. 340/870 |
| 6,069,564 A * | 5/2000 | Hatano et al. ........... 340/572.7 |
| 6,147,655 A | 11/2000 | Roesner |
| 6,229,443 B1 | 5/2001 | Roesner |
| 6,265,976 B1 | 7/2001 | Roesner |

* cited by examiner

Z-DIRECTION COIL (LEFT END)

Z-DIRECTION COIL (RIGHT END)

SYSTEM AND METHOD FOR COMMUNICATION WITH RADIO FREQUENCY IDENTIFICATION TAGS USING TOW MESSAGE DFM PROTOCOL

This patent application is related to U.S. application Ser. No. 09/406,092, entitled "SYSTEM AND METHOD FOR LOCATING RADIO FREQUENCY IDENTIFICATION TAGS"; U.S. application Ser. No. 09/405,364, entitled "SYSTEM AND METHOD FOR COMMUNICATION WITH DORMANT RADIO FREQUENCY IDENTIFICATION TAGS", and U.S. application Ser. No. 09/406,091, entitled "SYSTEM AND METHOD FOR LOCATING RADIO FREQUENCY IDENTIFICATION TAGS USING THREE-PHASE ANTENNA", which are being filed concurrently herewith on Sep. 24, 1999.

BACKGROUND OF THE INVENTION

1. Field of the Invention

The present invention relates to radio frequency communication, and specifically to the use of radio frequency identification (RFID) tags in conjunction with one or more radio frequency sensors to determine the position of the tag or an asset to which the tag is attached within three dimensional space.

2. Description of the Related Technology

The field of RFID (Radio Frequency Identification) is growing rapidly. Applications of RFID technology are wide ranging and include counting objects as they pass near to a sensor, uniquely identifying a specific tag (hereinafter "transponder") and associated asset, and placing data within the RFID transponder for later recovery. The process of "reading" and communicating with an RFID transponder generally comprises bringing the transponder in proximity to an RFID sensor which emanates a radio frequency wake-up field having a limited range. The RFID transponder detects the presence of the wakeup field of the sensor, and subsequently various forms or protocols of handshake occur between the transponder and the sensor in order to exchange data. All of this communication between the transponder and the sensor is performed using radio frequency carriers of some kind. When multiple transponders are involved, anticlash protocols of the type well understood in the data processing arts are employed in order to multiplex or provide multiple access to the sensor by the multiple transponders.

The main advantages of an RFID sensor and transponder system over other forms of ID tagging include (i) the orientation of the transponder with respect to the sensor is not critical for a correct read of the transponder information; (ii) communication can occur within comparatively harsh operating environments including dirt, grease, opaque gasses, etc.; and (iii) the communication range between the sensor and transponder can be significant (in excess of 100 feet in certain cases) even when the RF frequencies used are within the power limitations of Federal Communications Commission (FCC) rules concerning unlicensed transmitters. Accordingly, RFID technology is useful for several applications, especially those relating to security and asset management.

For example, in applications where enhanced security is desired, RFID systems using electromagnetic energy with very low frequency are attractive since the low frequency energy tends to suffer low losses from shielding materials such as metal boxes, aluminum foil, and the like. Those who would surreptitiously remove the tagged assets from a building usually try to use such shielding techniques. However, these low frequencies typically require large antennas within the transponder in order to achieve reasonable levels of RF coupling between the sensor and the transponder. It is impractical to place large wire antennas within small transponders; accordingly, comparatively small magnetic loop antennas are the coupling methods of choice for such small transponders. These magnetic loop antennas exhibit a serious drawback, however, in that they have a characteristic "figure-8" sensitivity pattern and, in certain positions and/or orientations, can reject or otherwise not detect the fields generated from the sensor. Stated differently, the magnetic loop antenna of the transponder can only receive energy from the sensor antenna coils only when the orientation of the sensor and transponder coils is similar. Specifically, the "rejection" solid angle for a loop antenna can be thought of as a band of a certain solid angle measured from the center and oriented 360 degrees around the circumference of the loop (see FIG. 1). When such rejection occurs, the transponder may be well within the sensor's intended wake up field, but fails to detect the sensor's emissions, and therefore also fails to communicate therewith. A related problem is when the position and/or orientation of the transponder within the field is varied, thereby taking the sensor(s) out of the "figure-8" pattern of the transponder antenna, and interrupting communication between the transponder and sensor.

Additionally, many existing RFID transponder/sensor systems do not have the ability to locate the transponder in spatial space. Those which do have this ability suffer from significant drawbacks since none of them will function using the low frequency signals needed to pass through foil and other shielding. The added capability of spatial positioning, however, allows the sensor to gather more information about the transponder, i.e., its relative location in space with respect to the sensor or some other reference point. This capability provides a very significant advantage over other asset management systems (RFID or otherwise) which can not determine the position of the assets.

Furthermore, existing RFID systems in which the transponder includes a motion sensor or other device which activates or otherwise permits the waking up of the transponder do not have provision for the transponder to communicate with the system sensor (reader) during periods when the transponder is not in motion, such as during installation or maintenance. Accordingly, such prior art transponders must be physically moved or agitated during these periods in order to enable the transponder to communicate with the sensor. This approach is cumbersome and inefficient.

Based on the foregoing, an improved apparatus and method for spatially locating an RFID transponder having a magnetic loop antenna within one or more sensor fields is needed. Furthermore, an improved apparatus and method for maintaining effectively constant and uninterrupted communication with the aforementioned RFID transponder regardless of physical position or orientation is needed. Lastly, an improved apparatus for interrogating and communicating with the RFID transponder when the transponder is not in motion or otherwise dormant is needed.

SUMMARY OF THE INVENTION

The foregoing needs are addressed by the invention disclosed herein.

In a first aspect of the invention, an improved system for and method of determining the position of one or more radio frequency identification (RFID) transponders with respect to one or more sensors is disclosed. In a first embodiment, the system comprises a plurality of stationary sensor arrays located within certain physical areas. Each sensor array comprises a plurality of antenna coils arranged in unique physical orientations with respect to each other and capable of transmitting radio frequency signals of differing phase. The RFID transponder includes a magnetic loop antenna which receives the plurality of signals generated by the antenna coils, and compares the phase of at least two of the received signals in order to determine the relative position of the transponder(s) with respect to the sensors.

In a second aspect of the invention, an improved system for and method of maintaining constant communication between one or more RFID transponders and their associated sensor(s) using a multi-message protocol is disclosed. In one embodiment, the system comprises sensor arrays having a plurality of antenna coils in a predetermined physical relationship which emit two direction finding mode (DFM) signals in succession. For the emission of the first DFM signal, each of the plurality of antenna coils is energized so as to emit a signal in its given orientation. For the emission of the second DFM signal, one of the plurality of coils is turned off such that no radio frequency signal is emitted from that coil. The spatial relationship of the transponder and individual antenna coils precludes all of the signals from each sensor array from being rejected by the transponder during the emission of both the first and second DFM signals. In this fashion, the transponder coil can be kept in constant communication with the sensor, regardless of its orientation with respect to the sensors. This feature effectively eliminates the communication problems associated with the typical "figure-8" pattern associated with the transponder's antenna coil.

In a third aspect of the invention, an improved method of determining the location of the transponder with respect to two or more sensor arrays through elimination of sensor rejection is disclosed. In one embodiment, the method comprises positioning the transponder with an internal antenna coil within the field generated by the coils of the individual sensor arrays, transmitting a first signal from each of the antenna coils of the two or more arrays, transmitting a second signal from a subset of the antenna coils of the same arrays (i.e., with one or more coils turned off), and determining the position of the transponder relative to the two or more sensor arrays based on the intensity of the first and second signals received by the antenna coil of the transponder.

In a fourth aspect of the invention, a system for and method of transmitting data between a sensor having a transmit coil and a RFID transponder having a receiving coil is disclosed. In one embodiment, the system comprises a hand-held sensor probe or wand which emits a highly intense and localized wake-up field at a predetermined frequency. This field is sensed by the receiving coil of the transponder, and its physical parameters (such as intensity and/or frequency) compared to predetermined values present within the transponder. If the sensed parameters of the wake-up field meet certain predetermined criteria, the transponder generates an internal wake-up signal, and begins communicating with the sensor. This system and method are particularly useful when using transponders having an internal motion detector, thereby allowing communication with the dormant (e.g., motionless) transponder without the need to physically move the transponder.

DETAILED DESCRIPTION OF THE INVENTION

Reference is now made to the drawings wherein like numerals refer to like parts throughout.

As used herein, the terms "tag" and "transponder" are used interchangeably, and are meant to include any mobile or semi-mobile radio-frequency device capable of transmitting, receiving, or both transmitting and receiving radio frequency energy in one or more frequency bands. Similarly, the terms "sensor", "transceiver", and "reader" are used interchangeably, and are meant to include any fixed or semi-mobile radio frequency devices capable of receiving, transmitting, or both receiving and transmitting radio frequency energy in one or more frequency bands.

Fundamental Operating Principles

Figure 2:
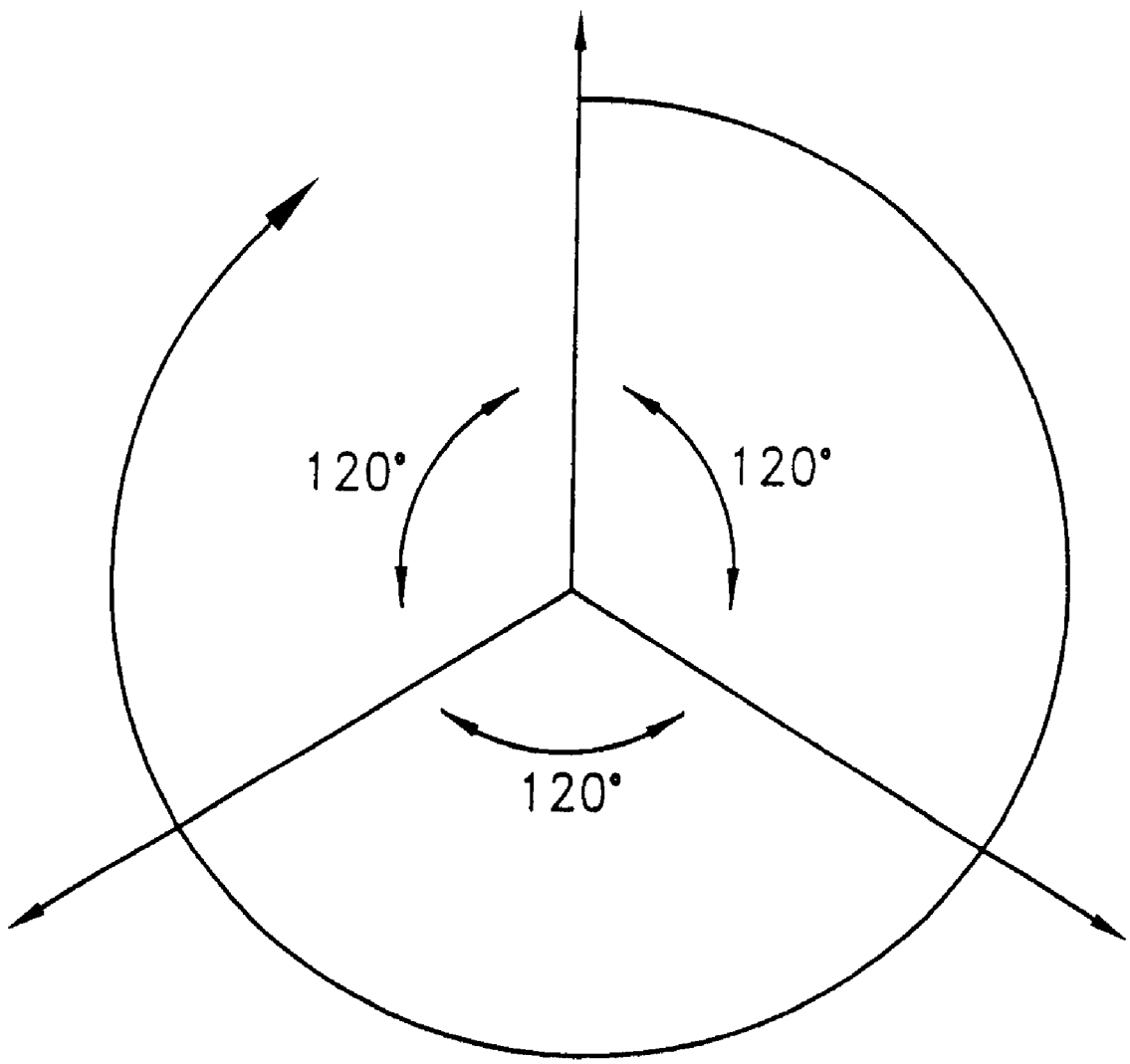
FIG. 2 is diagrammatic representation of the three carrier wave phase vectors associated with the present invention.

The fundamental operating principles of the present invention are now described with reference to FIGS. 2 through 4. The present invention broadly comprises a system by which an RFID transponder may communicate with an array of RF sensors, the signals emitted by the sensors aiding the transponder in locating its position relative to the sensors. As shown in FIG. 2, the present invention utilizes sensors (antenna coils) which emit three carrier waves each separated by a phase angle θ, the phase angle in the present embodiment being equal to 120 degrees. In another embodiment, other phase angles are envisioned. The three carrier waves are described by vectors where the magnitude of the magnetic field intensity H is described by:

$H = \sin(\omega t + \theta)$  Equation 1

Where:

θ=0, 120, and 240 degrees (0ρ, 2/3ρ, and 4/3ρradians), respectively, and

ω=angular frequency (radians/sec).

Figure 8:
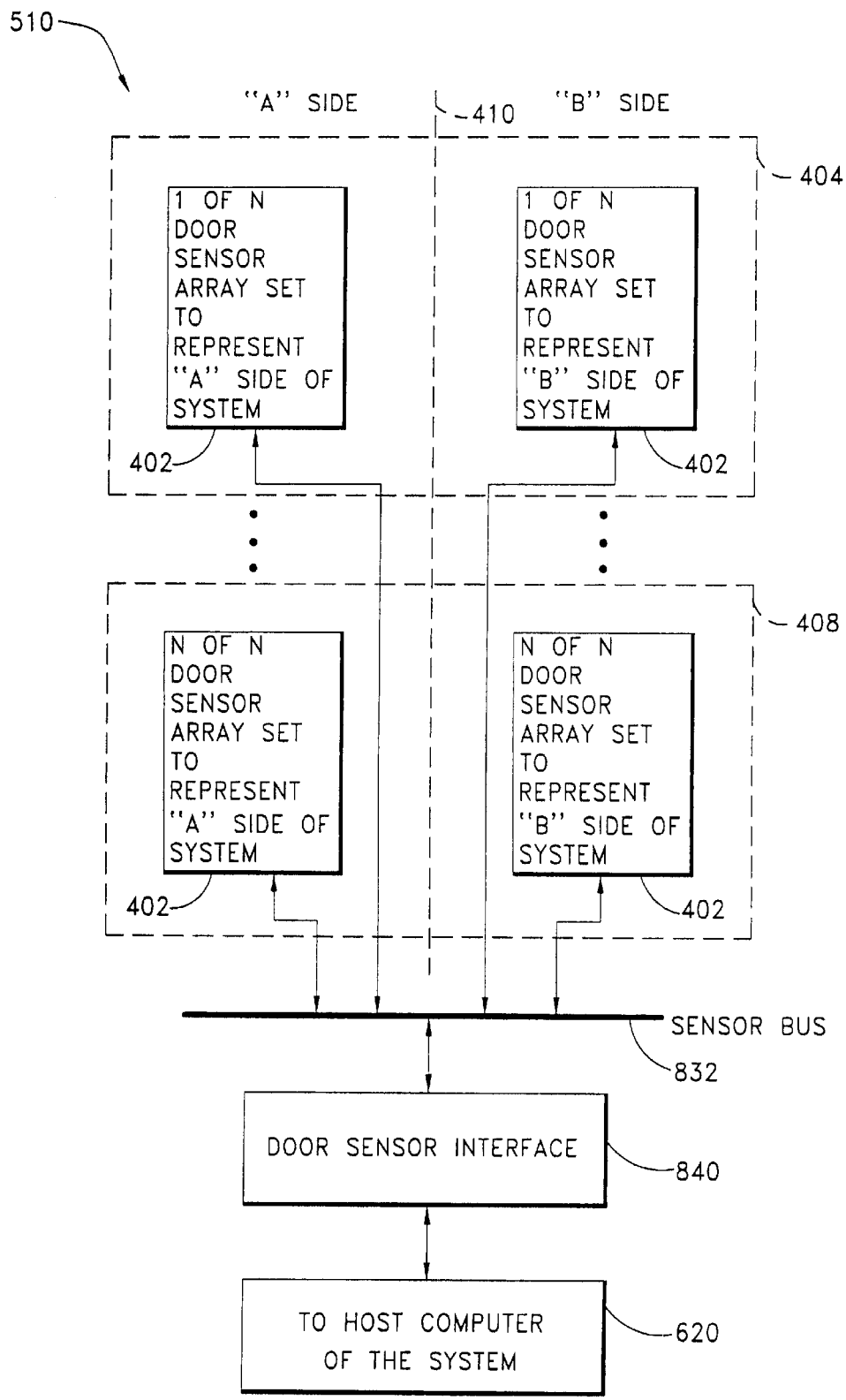
FIG. 8 is a block diagram of one embodiment of the sensor hardware and arrays shown in FIGS. 4, 5, and 6.

Each of the three phase-shifted carrier signals is transmitted by a corresponding loop antenna coil (see discussion of FIGS. 11–13 below), each antenna coil having its own "figure-8" pattern. Each of the three antenna coils is arranged on one of three axes of a Cartesian (i.e., X, Y, Z) coordinate system. Hence, the magnetic field intensity around the coils varies both as a function of position and time. Accordingly, the foregoing antenna coil and three phase carrier arrangement can be used to both transmit data to the transponder, and also provide information to the transponder regarding its position relative to the coils.

Figure 3:
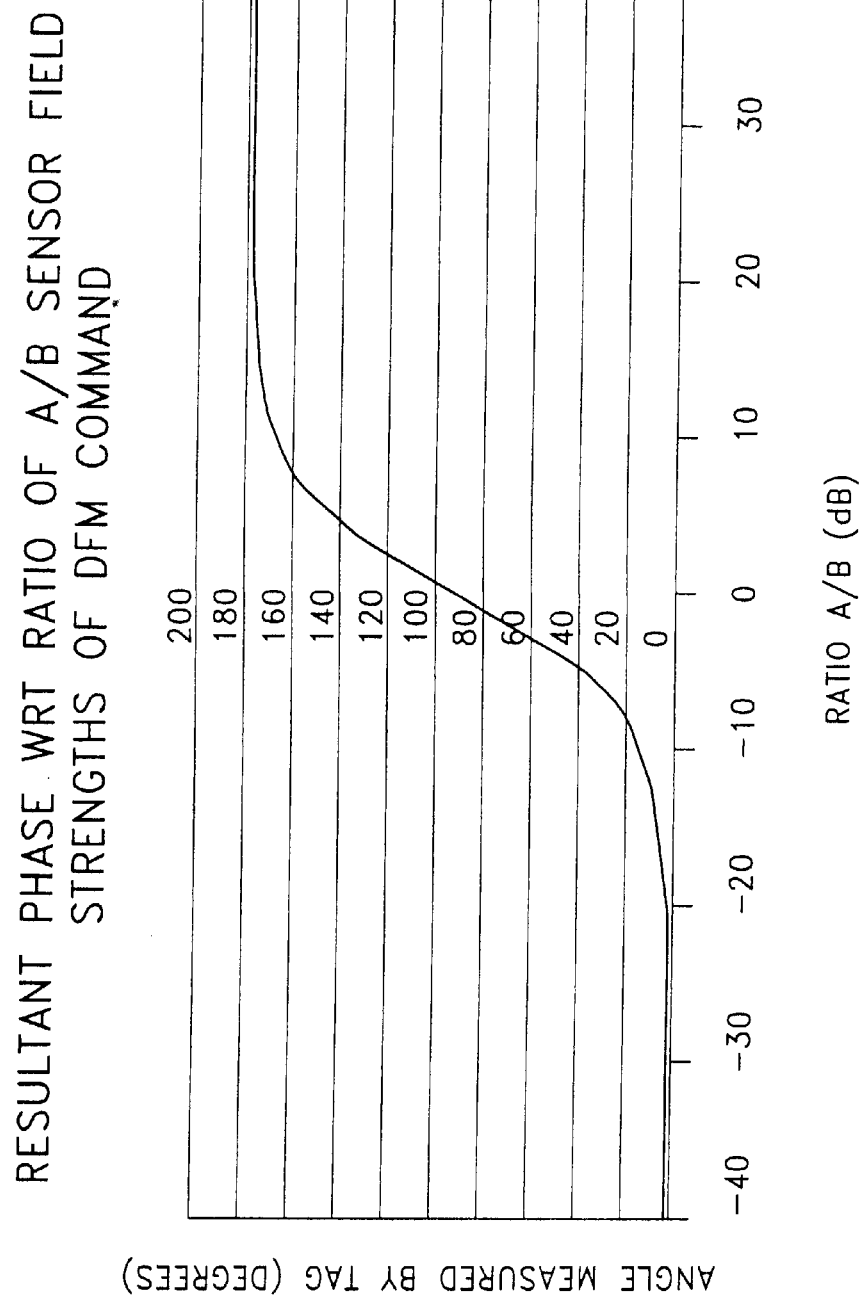
FIG. 3 is a plot illustrating the positional angle measured by the transponder of the present invention as a function of the intensity of the signals received by the transponder from two three phase sensor arrays.

As shown in FIG. 3, the system of the present invention utilizes the relative strength or intensity of the electromagnetic three phase signals radiated by two (or more) sensor arrays, herein designated as "A" and "B", in order to provide position information to the transponder. Specifically, the positional angle (relative to the antenna coils) is shown to be a function of the relative signals strengths present from the A and B arrays. The ratio of the signal strengths is defined as:

$\text{Ratio}_{AB} = 20 * \log_{10}(I_A/I_B)$  Equation 2

Where:

$I_A$=Intensity of received signal from "A" sensor array, and $I_B$=Intensity of received signal from "B" sensor array.

Hence, by knowing the intensity of the signals received from two antenna arrays, the tag may compute its positional angle relative to the known position of the arrays.

Figure 1:
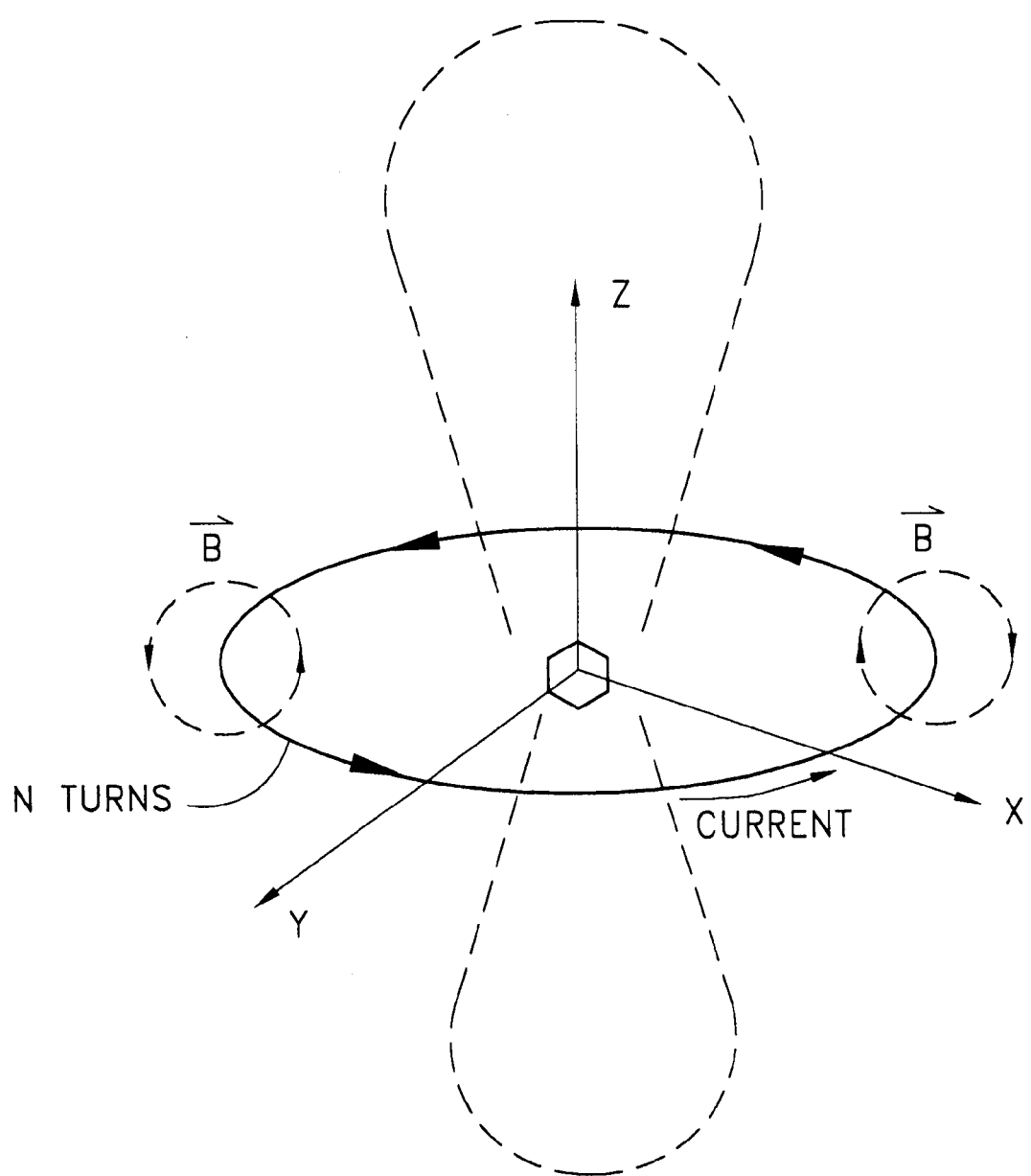
FIG. 1 is an illustration of the magnetic field sensitivity pattern of a typical prior art loop antenna having a circular shape, based on 10 db downpoints of field strength.
Figure 4:
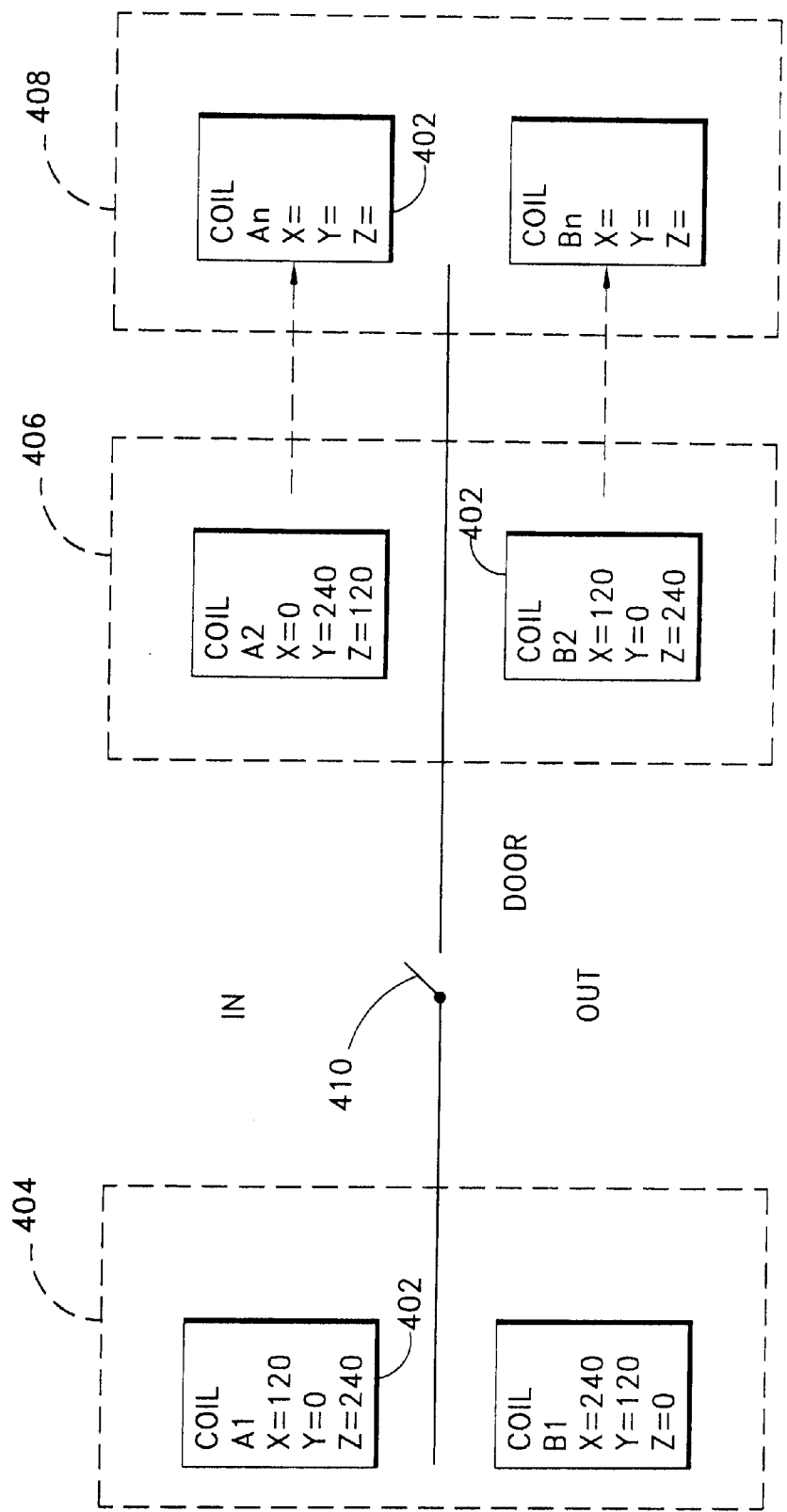
FIG. 4 is a plan view of an exemplary arrangement of the three phase sensor array of the present invention, placed with respect to a door.

Referring now to FIG. 4, one exemplary embodiment of the three phase sensor array of the present invention is described in order to further illustrate the foregoing principles. As shown in FIG. 4, the antenna arrays of the exemplary embodiment are arranged in pairs 404, 406, 408, where one antenna coil assembly 402 of each pair is defined as being in one location relative to a door 410 (i.e., "inside" a building or an area in the present illustration, designated by the letter "A") and the other coil assembly of each pair is defined as being in a second location relative to the door 410 (i.e., "outside" of the building or an area, designated by the letter "B"). The coil spatial and phase orientation is shown for an "N" pair system. Note that each of the coil assemblies contains three antenna phase coils having a differing electrical phase as previously described. The physical orientation of the coils may be as defined in FIG. 1. It will be appreciated that the illustrated system of sensor arrays may be set up over an infinitely long barrier if desired, or configured in other arrangements.

RFID Asset Management System

Figure 5:
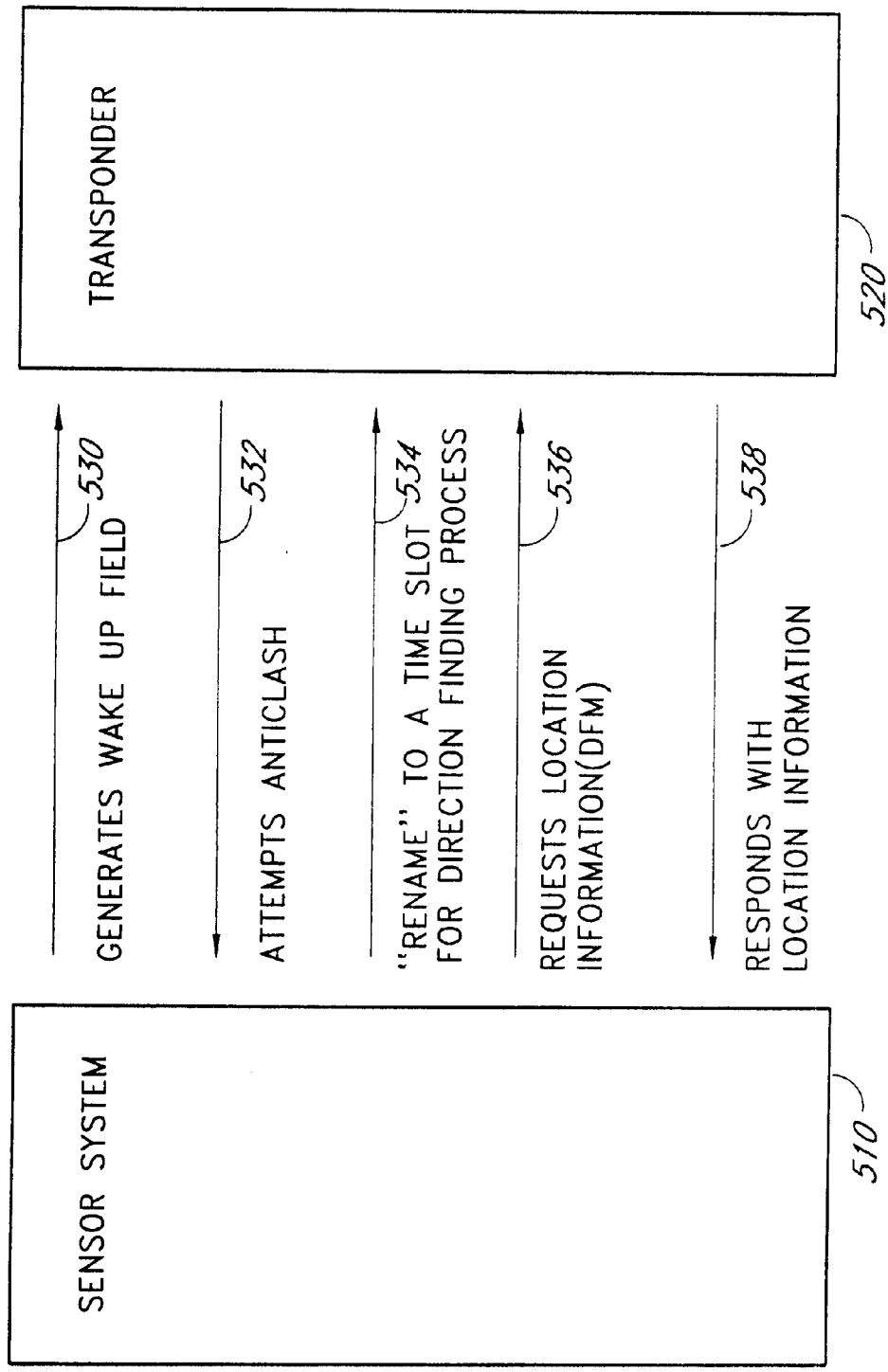
FIG. 5 is a logical block diagram showing a portion of the communications between an RFID sensor and transponder of the present invention.
Figure 14:
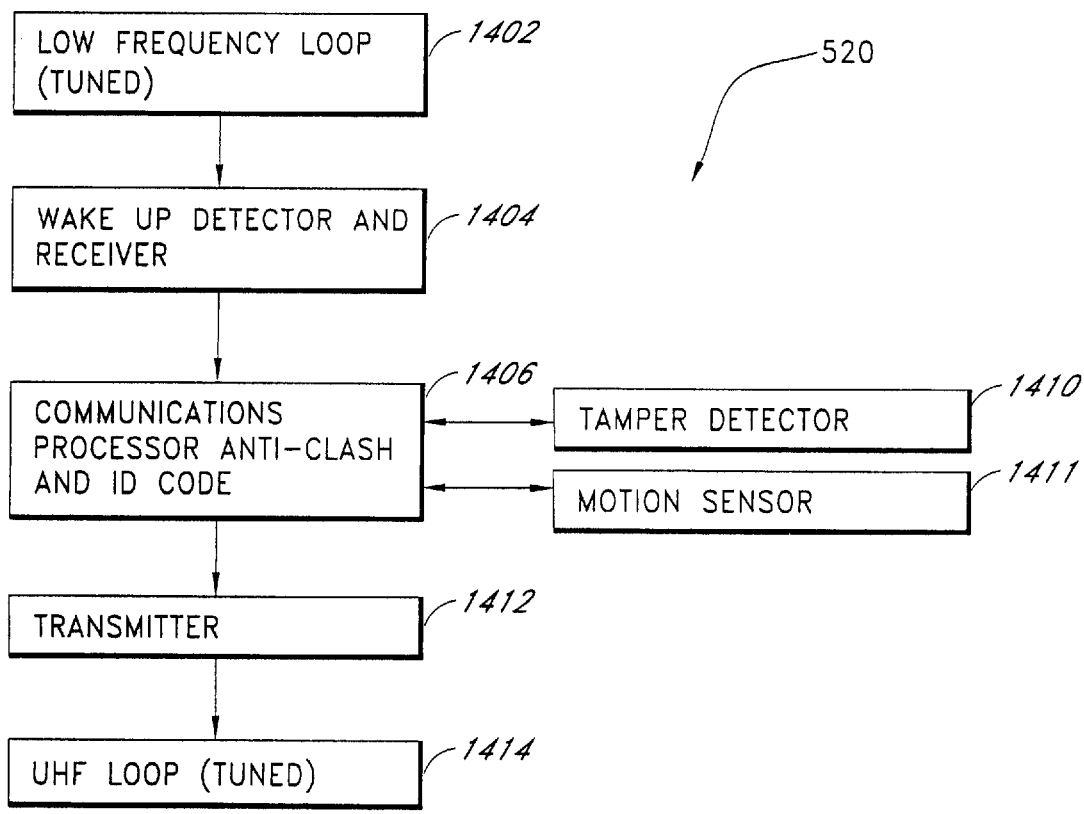
FIG. 14 is a block diagram of one embodiment of the hardware configuration for the RFID transponder shown in FIG. 5.

Referring now to FIG. 5, the operation of one embodiment of the RFID asset management system of the present invention is described in detail. As shown in FIG. 5, the system is comprised generally of a radio frequency reader or sensor system 510 and a corresponding transponder 520 which are each in communication with one another. Initially, the transponder 520 is dormant or in an inactive state when outside the field generated by the sensor(s) 510. This dormant state reduces the power consumption of the transponder, since its internal processor 1406 (FIG. 14) and other components are inactive. The sensor system 510 generates an electromagnetic "wake up" field 130 using an alternating current (AC) signal as is well known in the art; see the discussion of FIG. 15 below for more details regarding the sensor field pattern in various applications. This wake up field is generated by the sensor system 510 in order to toggle the transponder 520 into the active state when the transponder 520 enters the wake up field (i.e., when the field detected by the internal magnetic loop antenna 1402 of the transponder as illustrated in FIG. 14 is of sufficient intensity), and the transponder is in motion. In one embodiment, the sensor system 510 communicates with the transponder 520 using an 8.13 kHz phase modulated signal, although it will be appreciated that other frequencies and/or modulation schemes may be used. It will further be recognized that broadband (i.e., "spread spectrum") radio frequency techniques such as DSSS or FHSS may also be used, although the descriptions of the exemplary embodiments contained herein are in terms of a non-spread spectrum system. The transponder 520 then enters an "active" state and continues the communications protocol as generally illustrated in FIG. 5. Specifically, the transponder 520 next initiates an anti-clash routine 532 with the sensor system 510, after which the sensor acknowledges the transponder ID (including a cyclic redundancy code or CRC) and issues a "rename" command 534 to the transponder 520 in order to assign it to one of a plurality of time slots for the direction finding mode (DFM), explained in greater detail below with respect to FIG. 18. At this point, the sensor 510 requests information 536 as to the location of the transponder in the sensor field(s) from the transponder 520. The transponder 520 then responds with the requested location information 538, which is derived using one of a variety of techniques such as the relative signal strength method described with respect to FIG. 19 herein. Hence, the transponder 520 is used in the present invention to supply, inter alia, information regarding its position to the sensor(s) 510.

Figure 6:
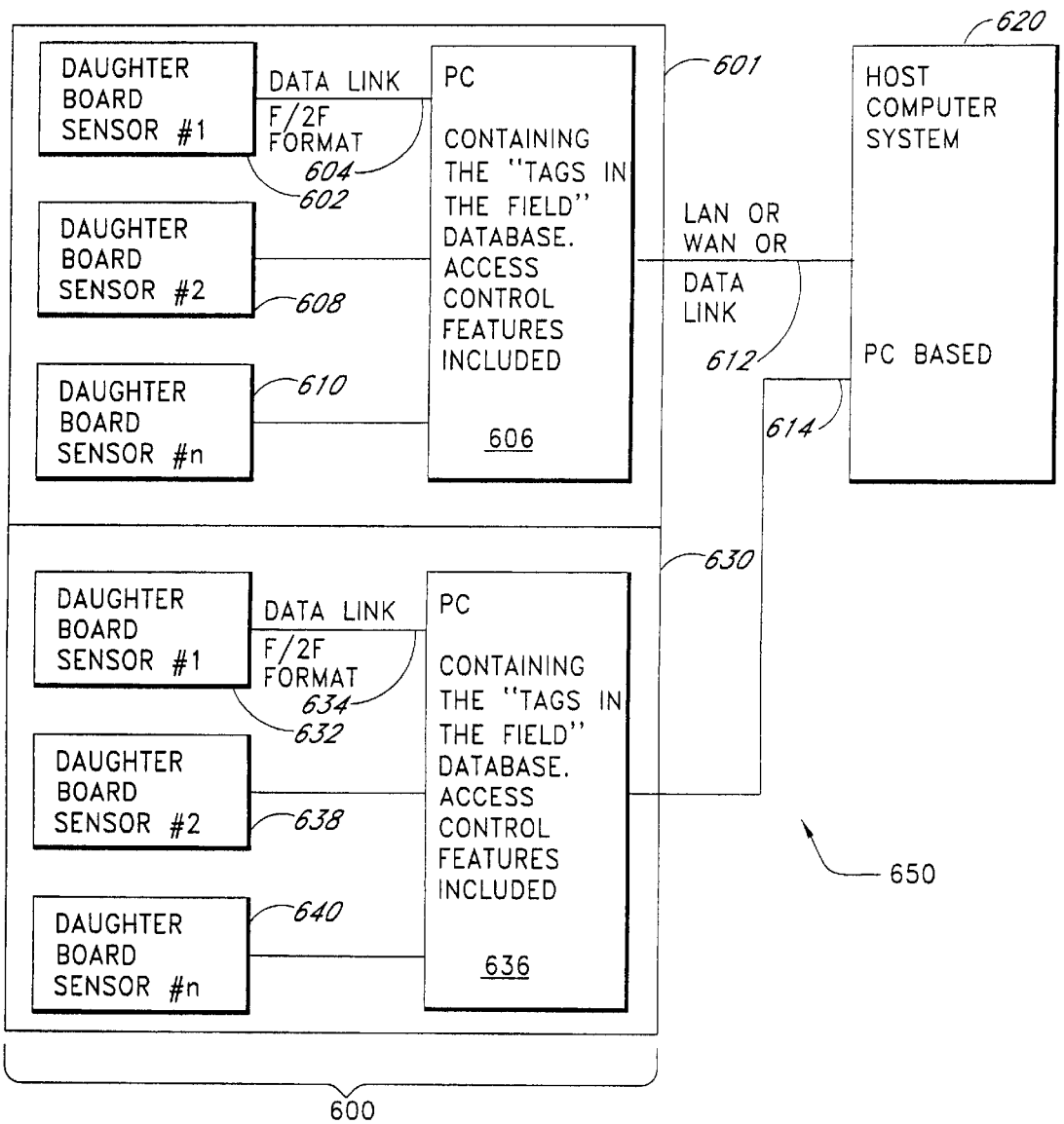
FIG. 6 is a block diagram of one embodiment of a stand-alone PC-based asset management system with network link according to the present invention.

Referring now to FIG. 6, one embodiment of a stand-alone PC-based asset management system with network link incorporating the three phase principles of the present invention is described. As shown in FIG. 6, the asset management system 650 generally comprises a personal computer (PC) based sensor processing system 600 coupled to a host computer system 620 via one or more data links 612, 614. In the present embodiment, the data links 612, 614 comprise network interfaces such as those commonly associated with a local area network (LAN) or wide area network (WAN) of the type well known in the art, although it will be appreciated that many other different types of data links such as SONET or wireless interfaces such as those compliant with IEEE Standard 802.11 may be used. Quite literally any interface capable of transferring information from one component to another can be substituted. The sensor processing system 600 comprises one or more sensor processing subsystems 601, 630 which each include a PC 606, 636 coupled to a plurality of individual daughter boards 602, 608, 610 and 632, 638, 640, respectively, each board having one or more radio frequency sensor coils (not shown) disposed thereon. In the illustrated embodiment, the daughter boards are connected to their respective PCs 606, 636 via frequency, coherent phase (F/2F) format data links, such as links 604, 634, of the type well known in the magnetic recording arts, although it will be appreciated that other types of data links may be used.

Figure 7:
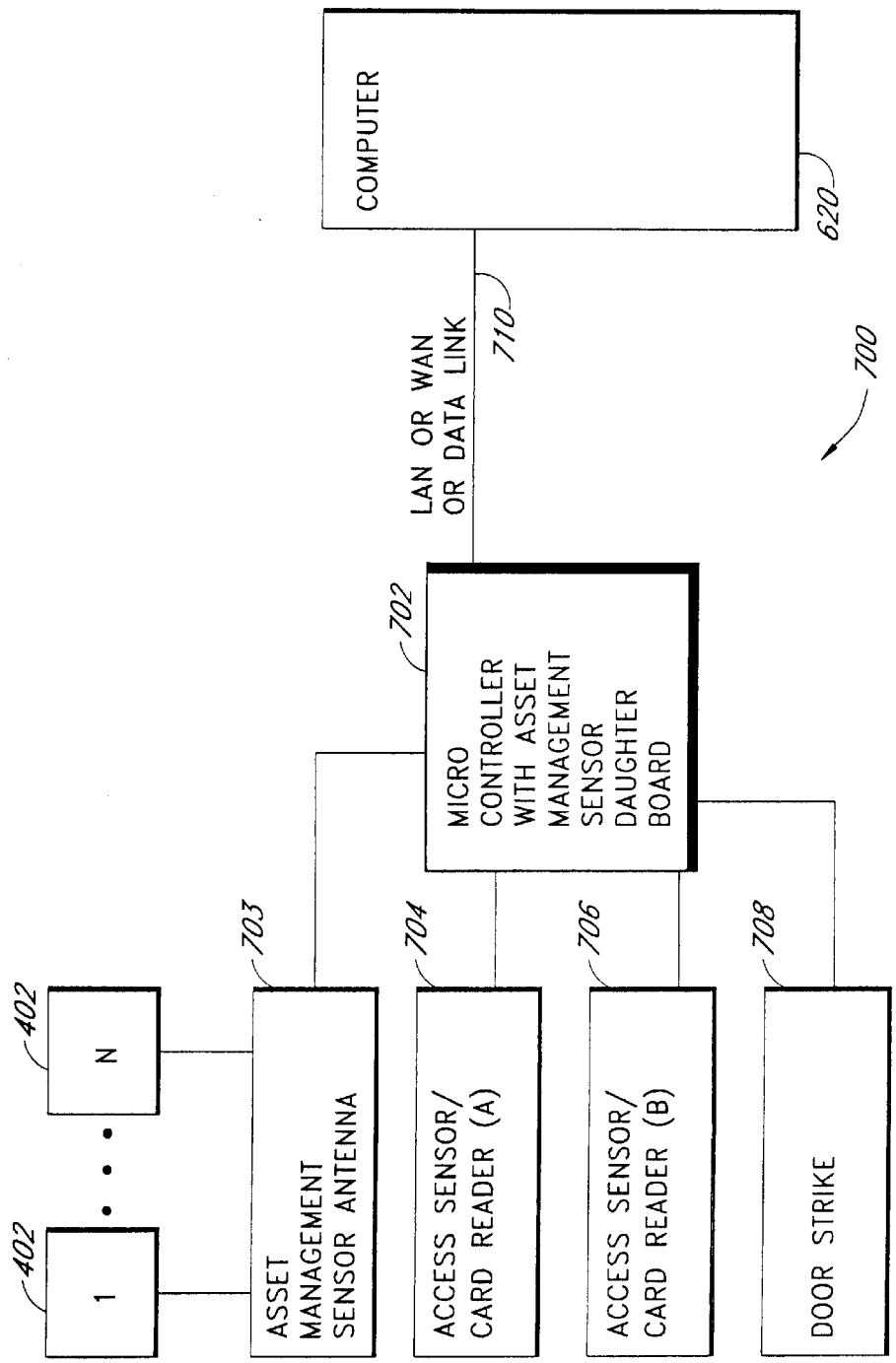
FIG. 7 is a block diagram of one embodiment of a security system with network link according to the present invention.

Referring now to FIG. 7, one embodiment of a security system with network link incorporating the present invention is described. As shown in FIG. 7, the system 700 comprises a microcontroller 702 having an asset management sensor antenna array 703, a plurality of access sensors/card readers 704, 706, and a door strike 708 coupled thereto. The microcontroller 702 includes an asset management sensor daughter board (not shown), the latter which permits the microcontroller to interface with the asset management sensor array 703. The asset manager sensor array 703 includes one or more sensor arrays 402 of the type previously described for communication with one or more transponders 520. The microcontroller 702 is further coupled to a host computer 620 such as a personal computer or minicomputer via an interface processor (not shown) and a data link 710 of the type well know in the data processing arts. The microcontroller 702 in the illustrated embodiment is a Model No. Micro-5 microcontroller manufactured by the Casi-Rusco Corporation, although other devices may be substituted. The microcontroller 702 receives an asset management database from the host computer 620 during operation, and all assets entering the sensor system's range are stored and forwarded to the host computer 620. Conventional card readers 704, 706 are coupled to the microcontroller 702 to allow personal access and asset management using the same system.

Referring to FIG. 8, one embodiment of a sensor hardware configuration of the antenna coil assemblies 402 and sensor system 510 of FIGS. 4 and 5, respectively, is now described. In the illustrated embodiment, the sensor system 510 is configured such that the antenna coil arrays 402 are disposed in pairs 404, 408 in relation to a door, an opening, a virtual barrier, or other location (shown generically as a door 410 in FIG. 4). As in FIG. 4, a set of sensor arrays 402 are partitioned on opposite sides, shown as side "A" and side "B" of the door 410. The arrays 402 may be factory set (for example, set for field strength, location, orientation, etc.), or set by an installer or the end user. The sensor arrays 402 are each connected to a sensor bus 832. In the illustrated embodiment, the sensor bus is configured according to the RS-485 format, although other arrangements may be used. The sensor bus 832 connects to a sensor interface 840, which is further connected to the host computer 620 (FIG. 6). The sensor interface 840 includes an industry standard 8051 type microprocessor, and random access memory (RAM) and read-only memory (ROM) circuits (not shown) to track the locations of the transponders and to process communications with the sensor arrays and with the host computer. It will be recognized, however, that other components and configurations may be used in place of the microprocessor/ROM/RAM combination described herein.

The sensor arrays 402 of the present embodiment may be configured as bar-shaped units located on the top or side of a door, or above a drop ceiling, although other configurations are possible. The antenna coils of the sensor arrays 402 emit an interrogating or wake up field to the transponders, and deliver the transponder identification data received from the transponder(s) 520 to the host computer 620. The location of the transponder with respect to the sensor arrays 402 (i.e., "A" side or "B" side) is also provided to the host computer 620, using the method described with respect to FIG. 16 below. Additionally, the sensor system 510 establishes whether the transponder 520 has passed through the virtual barrier. This feature aids in entry control to restricted areas, as well as associating an asset with a person. The host computer 620 is also warned of any condition that may compromise the sensor system 510 or transponder 520 capabilities (e.g., jamming) by decoding the status byte sent by the tag during the anti-clash process. If the tag determines that there is interference in the band where the tag is listening for communication from the sensor, the tag emits the jamming alert in an un-synchronized manner.

Figure 9:
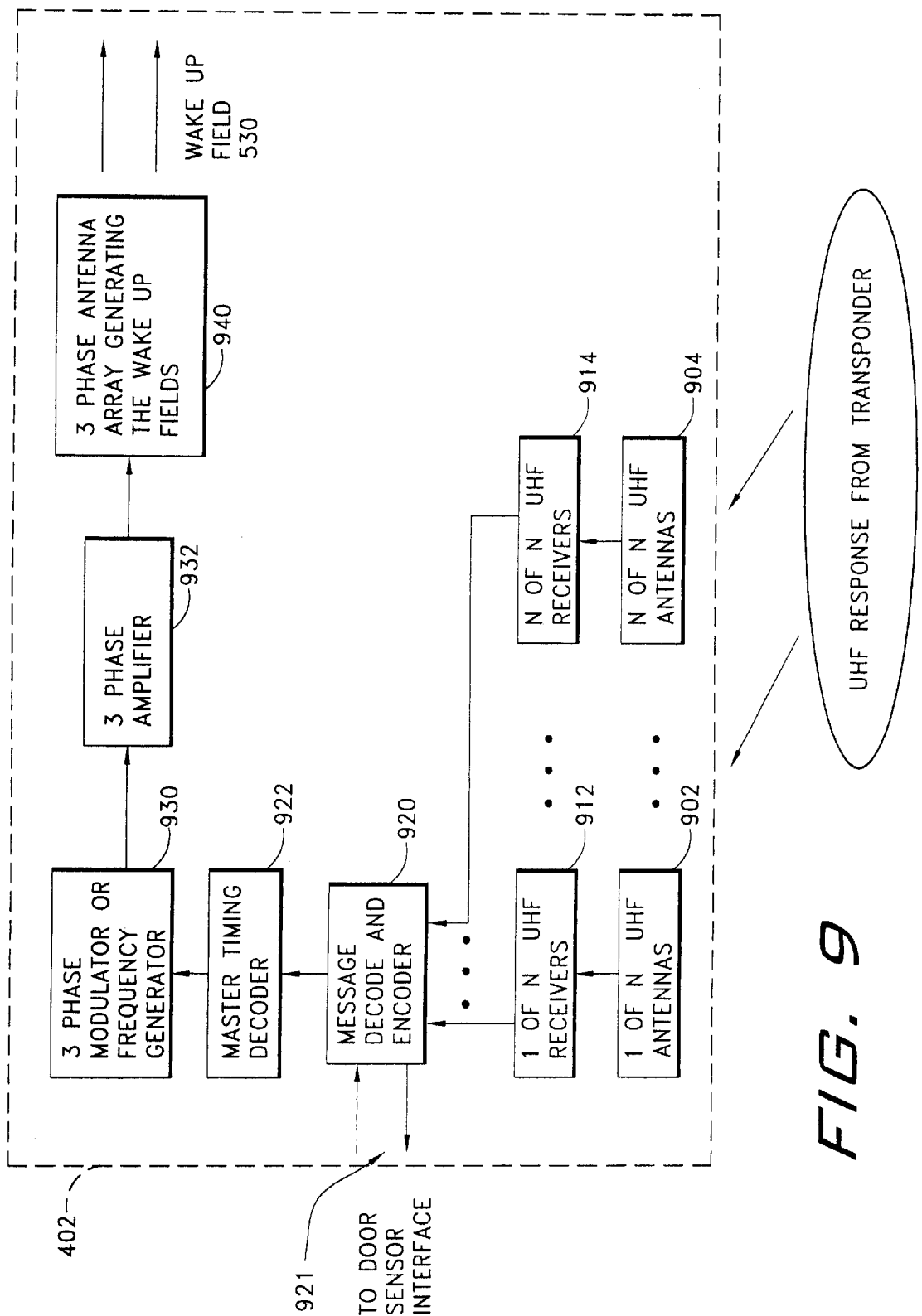
FIG. 9 is a block diagram of one embodiment of the sensors used in the sensor arrays of FIG. 8.

Referring to FIG. 9, one embodiment of a sensor array, such as sensor array 402 shown in FIGS. 4 and 8, will be described in detail. In the illustrated embodiment, the sensor arrays 402 receive an ultra high frequency (UHF) response from a transponder 520 (FIG. 5) at a set of UHF antennas ("1 of N" antenna 902 through "N of N" antenna 904). Each of these antennas 902, 904 sends the received signal to a set of corresponding UHF receivers ("1 of N" receiver 912 through "N of N" receiver 914). Each of the UHF receivers 912, 914 processes the received UHF signal and sends its output to a message decoder and encoder (MDE) circuit 920. The MDE 920 includes an the input and output (I/O) interface 921 for the sensor array with the sensor interface 840 shown in FIG. 8. Master timing, transmit signals, and receive signals are all communicated on the I/O interface of the MDE 920.

The UHF receivers (902–904) operate on a multichannel frequency and are configured so as to be capable of continuous reception. A UHF antenna 1414 (FIG. 14) of the transponder 520 is configured to transmit data to the sensor system 510 using a 434 MHz nominal amplitude modulated (AM) carrier. The data bits are biphase coded using half bits of 330 microseconds in the illustrated embodiment. Biphase coding is well known in the art, and accordingly will not be discussed further herein. Signal strength information from the UHF receivers informs the message encoder 920 of incoming RF energy from the transponders 520, such as a burst of data. The UHF receivers send the signal levels and any received data to the message encoder 920 for communication with the host computer 620 via the sensor interface 840.

As previously noted, the sensor array 402 also generates a "wake up" field 530 directed to the transponder(s) 520. The door sensor interface 840 sends master timing and other control signals to the MDE 920. The MDE 920 decodes the message from the sensor interface 840 and sends the signals to the master timing decoder 922. The output of the master timing decoder 922 is connected to a three phase modulator/frequency generator 930. The output of the three phase modulator/frequency generator 930 is input to a three phase amplifier 932 which then supplies the three phase antenna array coils 940. The three phase antenna array coils 940 generate the wake up field 530 which is transmitted to the transponders 520. The three phase amplifier 932 and the three phase antenna array coils 940 comprise a three phase transmitter circuit and are described in greater detail in conjunction with FIG. 10.

Figure 10:
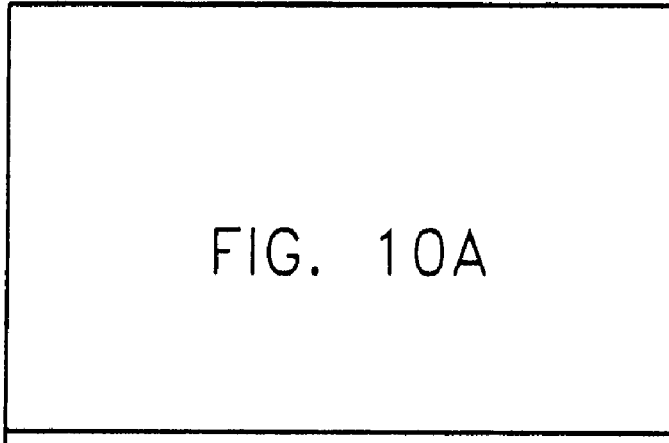
FIG. 10 is a schematic diagram of the three phase transmitter and antenna array portions of the sensor shown in FIG. 9.
Figure 10:
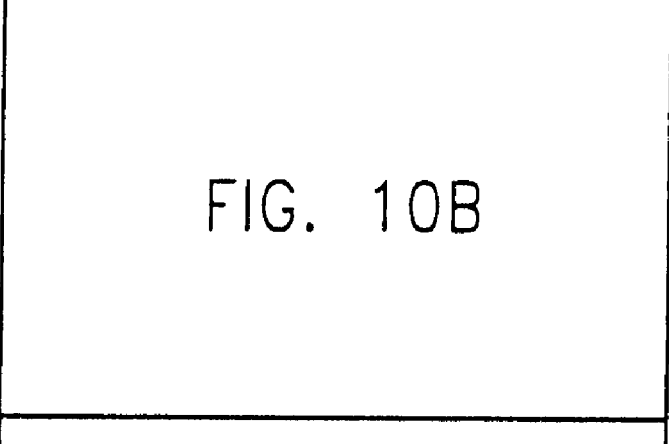
Figure 10:
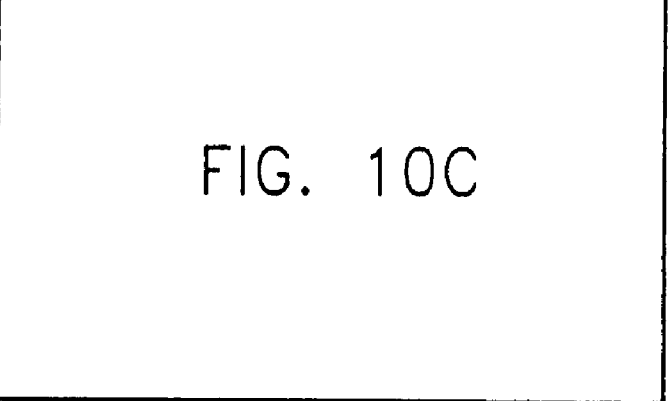
Figure 10A:
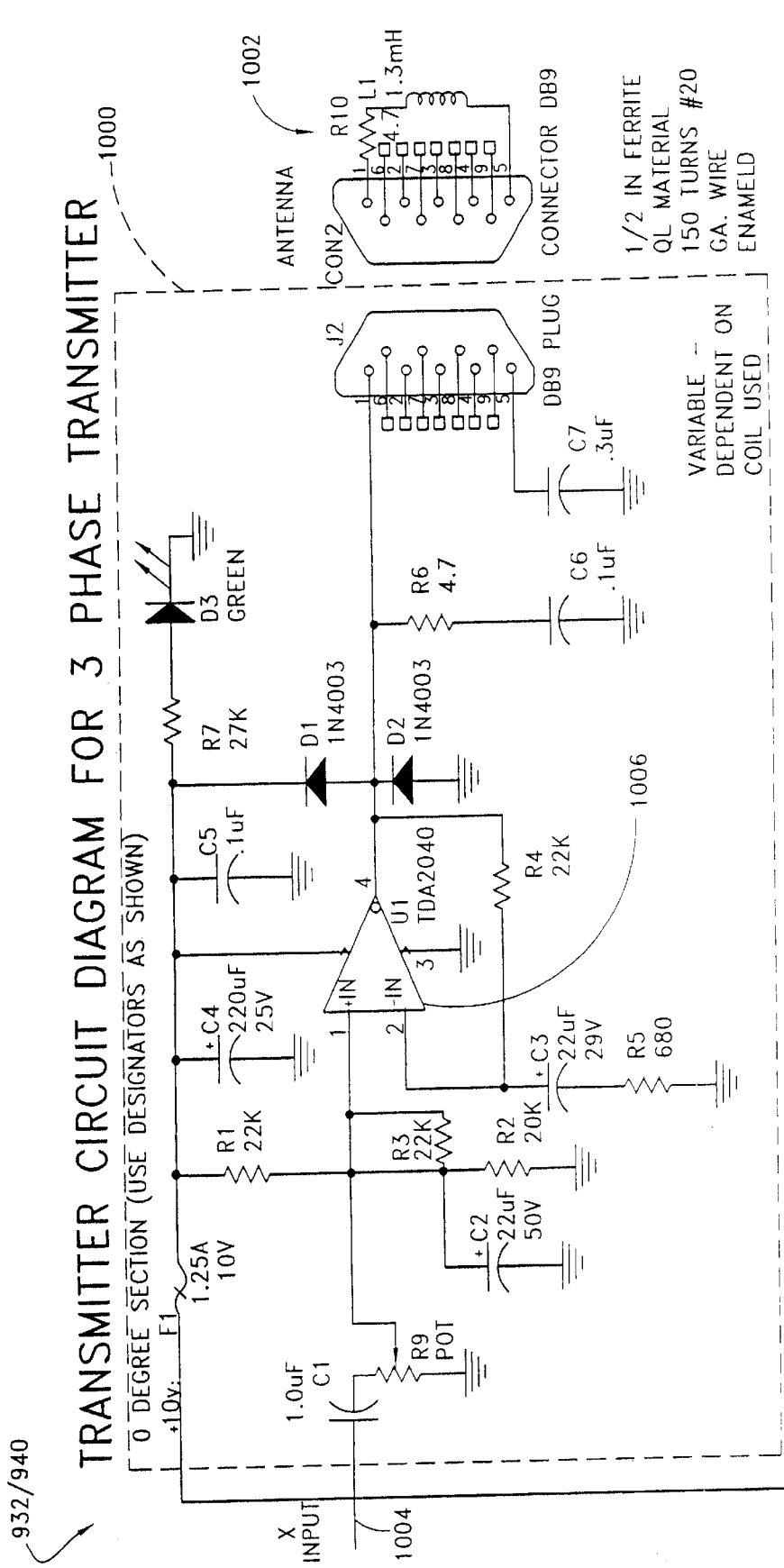
Figure 10B:
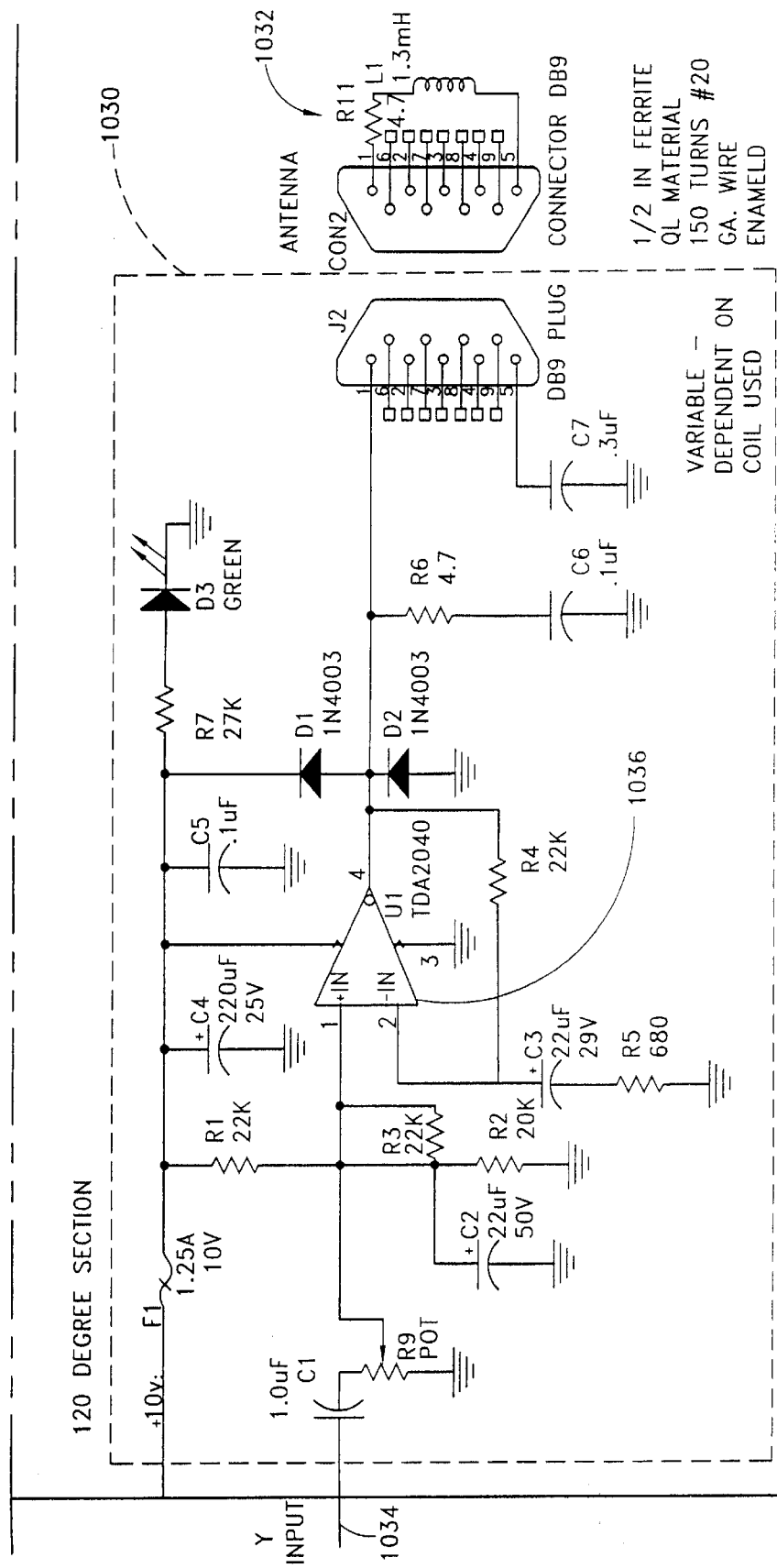
Figure 10C:
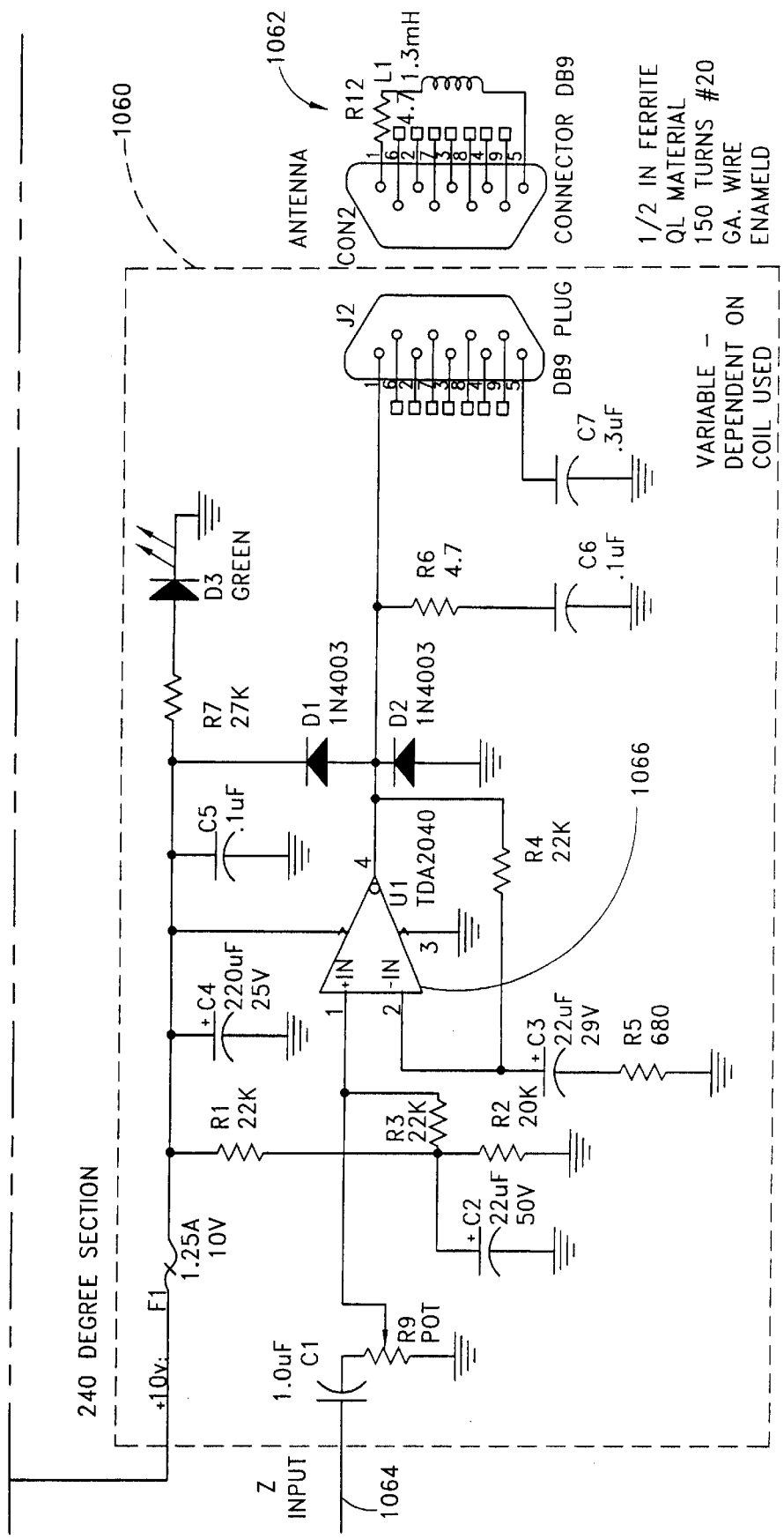

FIG. 10 illustrates one exemplary embodiment of the three phase amplifier 932 and antenna array coils 940 of the door sensor shown in FIG. 9. As shown in FIG. 10, the amplifier 932 and antenna array 940 comprise three discrete circuit phases 1000, 1030, 1060 which are electrically coupled to corresponding antenna elements 1002, 1032, 1062. The three phases 1000, 1030, 1060 each take a respective input signal 1004, 1034, 1064 from the three phase modulator/frequency generator 930 (FIG. 9), amplify the signal, and output the amplified alternating current signal to the respective antenna element 1002, 1032, 1062. As described with reference to FIG. 2 above, the signals for each phase 1000, 1030, 1060 of the illustrated embodiment are shifted by 120 degrees of electrical phase as is well known in the electrical arts. Accordingly, the electromagnetic radiation emitted from the respective antenna elements 1002, 1032, 1062 is correspondingly shifted in phase such that magnetic and electric field intensity at a given point in space attributable to each antenna element is also shifted in phase. While the illustrated circuit phases 1000, 1030, 1060 employ, inter alia, operational amplifiers 1006, 1036, 1066 to perform the amplification function, it will be recognized that a variety of other components and arrangements well know in the art may be used to amplify the input signals 1004, 1034, 1064.

Figure 11:
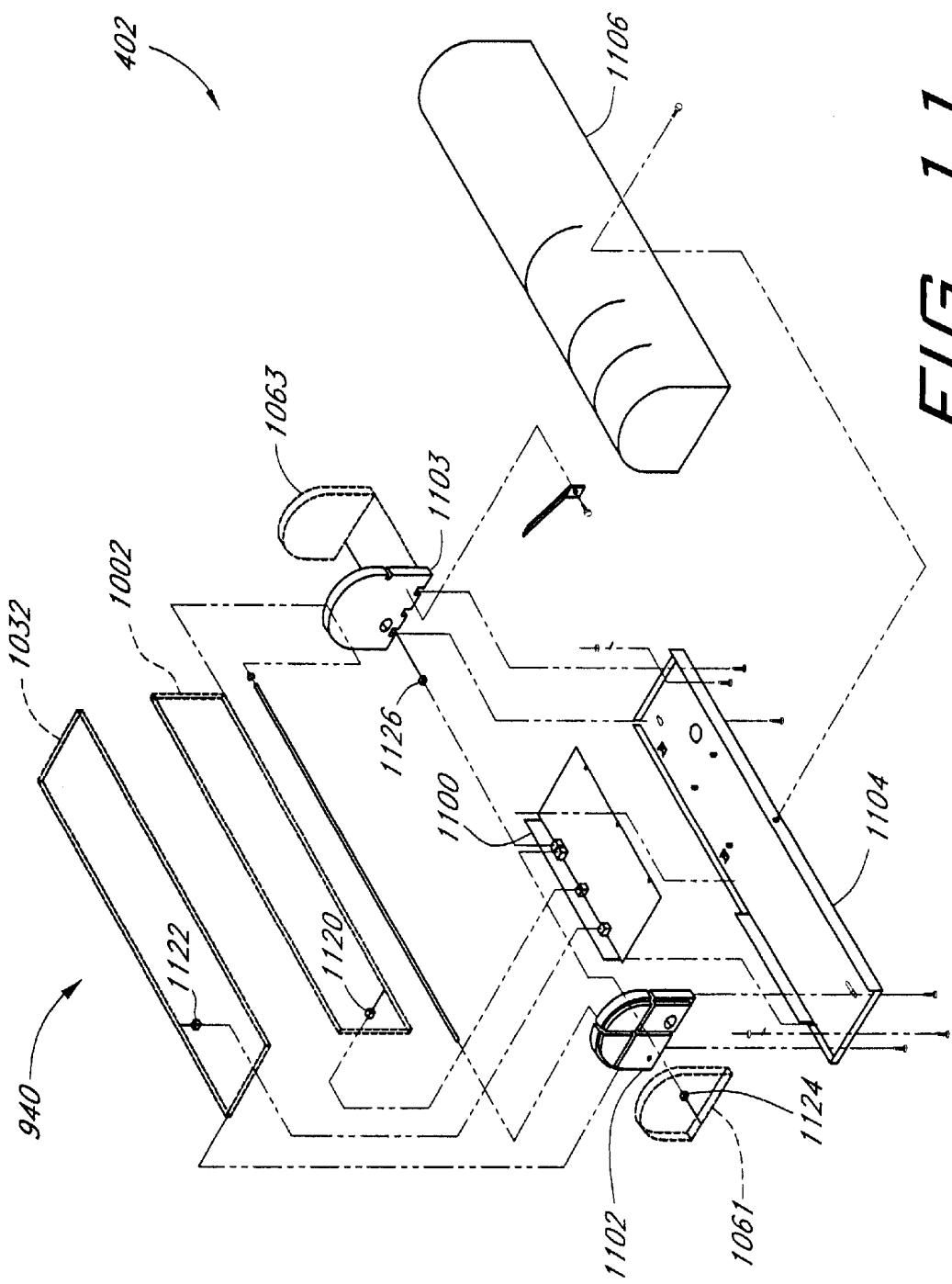
FIG. 11 is a physical assembly diagram showing one embodiment of the antenna coil configuration of the sensor arrays shown in FIGS. 8 and 9.

Referring now to FIG. 11, one embodiment of the physical configuration of the antenna transmit/receive coils 940 within the sensor arrays 402 of the present invention is described. Each sensor array 402 comprises generally three antenna elements 1002, 1032, 1062 which are electrically coupled to the output of the circuit phases 1000, 1030, 1060 as shown in FIG. 10. The antenna elements 1002, 1032, 1062 are physically comprised of loops of conductive material which are arranged so as to generate magnetic flux in three orthogonal axes (e.g., the X, Y, and Z axes in a Cartesian system) when alternating electrical current is passed there through. Specifically, the sensor array illustrated in FIG. 11 is comprised of a substantially rectangular "X" antenna coil 1002, a substantially rectangular "Y" antenna coil 1032, and a pair of semi-circular "Z" end coils 1061, 1063 electrically arranged in a Helmholz circuit of the type well known in the antenna arts. The Helmholz arrangement of the end coils 1061, 1063 provides the Z-direction with an antenna aperture similar to that of one of the larger X or Y coils 1002, 1032, thereby providing a more uniform field intensity in each of the three axes.

In a second embodiment, the antenna coils 1002, 1032, 1062 of the sensor array 402 are comprised of a ferrite loaded material wound with a plurality of turns of thin (i.e., 20 ga.) copper wire. Other antenna coil configurations may be used as well.

The four antenna coil elements 1002, 1032, 1061, 1063 are physically connected to their respective circuit phases (and to each other in the case of the end coils 1061, 1063) via plug-in connectors 1120, 1122, 1124, 1126 mounted on a printed circuit board 1100 located within the sensor array housing cover 1106. The cover 1106 forms a portion of the exterior housing of the sensor array 402, which is also comprised of two end covers 1102, 1103 and a base plate 1104. The PCB 1100 is affixed to the base plate 1104, as are the end covers 1102, 1103 and the housing cover 1106. The end covers 1102, 1103, base plate 1104, PCB 1100, and housing cover 1106 cooperate to maintain the antenna coils 1002, 1032, 1061, 1063 in the desired physical alignment (i.e., the X and Y coils orthogonal to each other as well as the two end coils) when the sensor array 402 is assembled. The housing cover, end covers, and base plate are constructed of plastic, plastic, and metal, respectively. These materials are chosen for their magnetic permeability with respect to the RF energy generated or received by the antenna coils. It will be recognized by those of ordinary skill in the mechanical arts, however, that a wide variety of housings or structures useful for maintaining the antenna coils in the desired positions, as well as materials of construction thereof, may be substituted for the arrangement of FIG. 11.

Figure 12A:
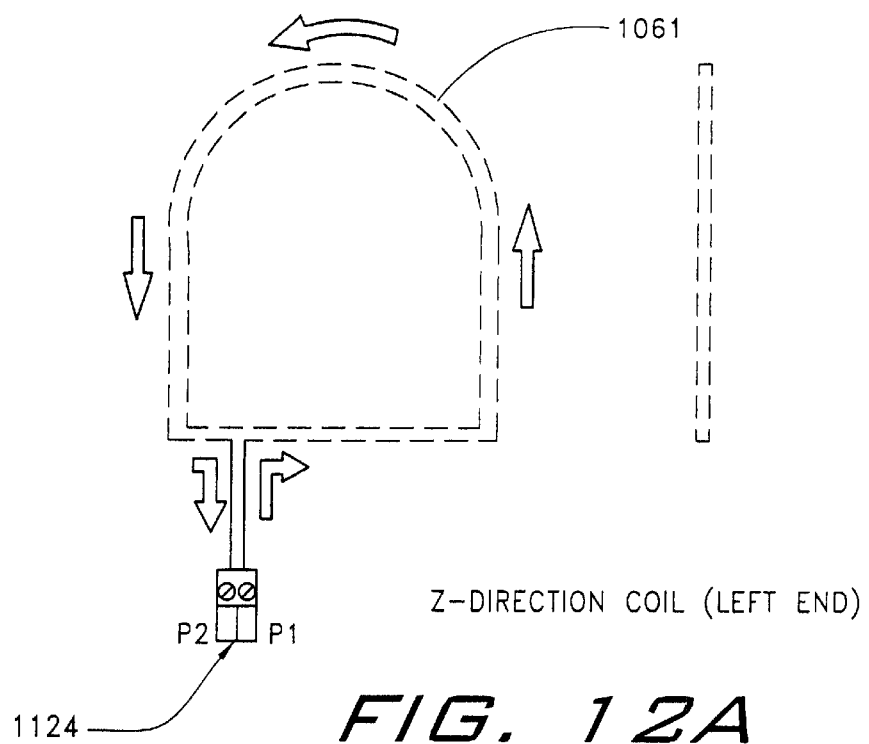
FIGS. 12A and 12B are diagrams of one embodiment of the end coils (left end and right end, respectively) for the Z-direction of the antenna coil configuration shown in FIG. 11.
Figure 12B:
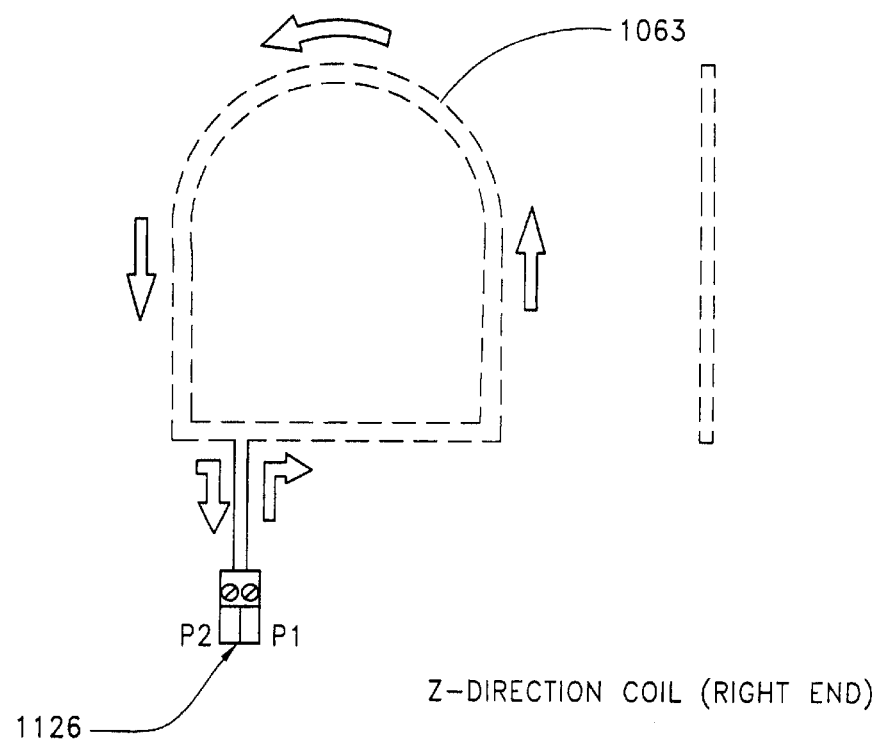
Figure 13A:
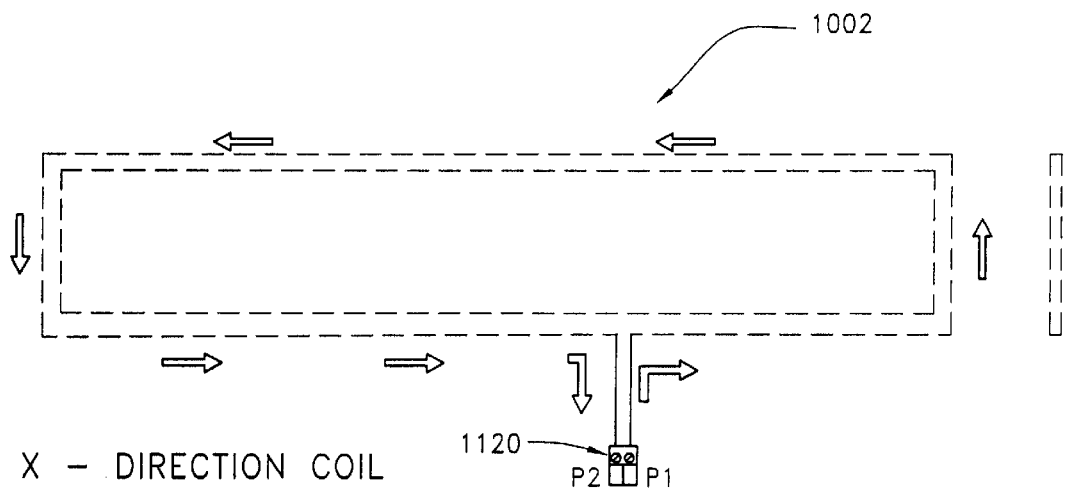
FIG. 13A is a diagram of one embodiment of the X-direction coil of the antenna coil configuration shown in FIG. 11.
Figure 13B:
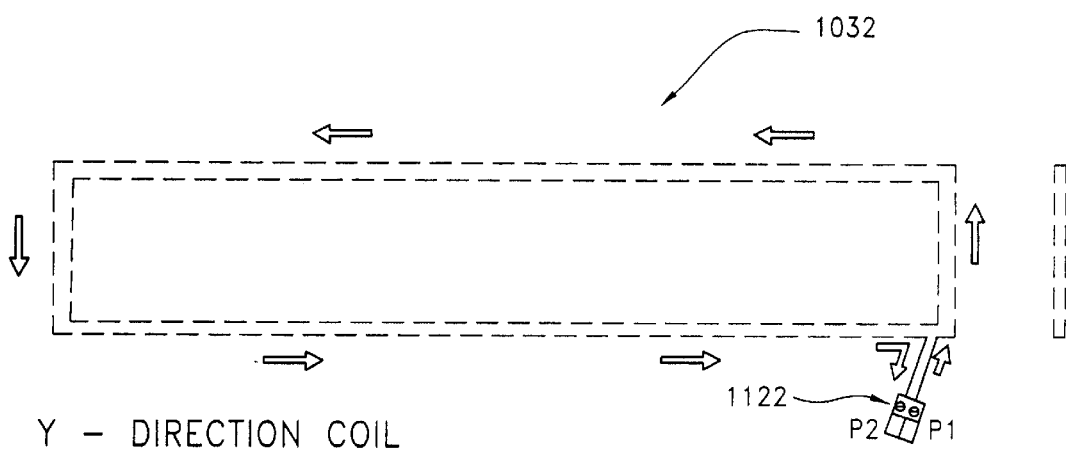
FIG. 13B is a diagram of one embodiment of the Y-direction coil of the antenna coil configuration shown in FIG. 11.

FIGS. 12A through 13B further illustrate the sensor antenna coil arrangement and direction of electrical current flow of each coil in the sensor array of FIG. 11. FIGS. 12A and 12B are diagrams of the end coils 1061, 1063, respectively, for the Z axis. FIGS. 13A and 13B illustrate the X-direction coil 1002 and Y-direction coil 1032 of the sensor array, respectively.

Referring now to FIG. 14, one embodiment of the internal hardware configuration for the asset transponder 520 of FIG. 5 is described. As previously described, a low frequency tuned loop antenna 1402 receives transmissions from the sensor system 510 (FIG. 5). In one embodiment, the low frequency used is approximately 8 kHz, although frequencies in the range of 0 to 1 GHz may also be utilized. The transmissions received by the transponder include, inter alia, the wake up field 530 generated by the sensor system 510 (FIG. 5) as well as other data such as the "rename" command 534 and request for location information (DFM) 536. The output of the loop antenna 1402 is fed to a wake up detector and receiver circuit 1404. The wake up detector portion of the circuit 1404 detects a wake up field received by the transponder loop antenna 1402 by measuring the intensity of the received signal, and the receiver portion of the circuit 1404 receives and processes the low frequency data signals received by the loop 1402. The wake up detector and receiver circuit 1404 is further described in conjunction with FIG. 17 below.

As shown in FIG. 14, the output of the circuit 1404 feeds a communications processor 1406 disposed within the transponder 520. The processor 1406 is responsible for the processing of, inter alia, portions of the anti-clash, CRC, and ID code functionality described below. The processor of the present embodiment is a Model No. 161V58 8-bit processor manufactured by Microchip, although other types of processor may be used. The system can also be encoded into a state machine and developed as an application specific integrated circuit (ASIC). A tamper detector 1410 and/or motion sensor 1411 are also interconnected with the processor 1406. The tamper detector 1410 helps determine if attempts are being made to tamper with the transponder 520, while the motion sensor 1411 assists the processor in determining if the transponder 520 is in motion. The tamper detector 1410 of the illustrated embodiment comprises a switch-type arrangement using a normally closed switch of the type well known in the electrical arts, although other types of detectors may be used. The motion sensor 1411 is, in the present embodiment, a bi-morphous accelerometer of the type well known in the art, although it will again be recognized that other types may be substituted.

The processor 1406 of the transponder 520 further connects to a transmitter circuit 1412 which in turn supplies a tuned ultra-high frequency (UHF) loop antenna 1414. The UHF loop 1414 is used for sending messages, such as the ID code, to the sensor system 510. The UHF loop of the illustrated embodiment operates at a frequency of 434 MHz, although other frequencies may be used. In one embodiment, the UHF loop does not receive any signal from the sensors.

In the present embodiment, the transponder 520 remains dormant until either: (i) the motion sensor 1411 is activated by motion of the transponder 520 and a low frequency, e.g., 8 kHz, RF signal is detected; (ii) the tamper detector 1410 is activated (such as by someone trying to open the transponder 520 or remove it from the asset to which it is attached); or (iii) a high-intensity localized wake up field is received as described with respect to FIG. 20 herein.

When the 8 kHz wake up field is detected, the transponder emits its ID code at the respond command from the sensor system 510. The 8 kHz field is modulated, thereby permitting data transfer from the sensor system 510 to the tag 520 via the signal. When the sensor system detects the ID code of the transponder (which is transmitted back to the sensor system by the transponder loop antenna), the sensor system 510 records the transponder ID and instructs the transponder 520 to stop transmitting. Subsequently, the sensor system 510 transmits a direction finding command to check for the position of the transponder 520. When the transponder 520 is in the control of the sensor system 510, the rate of interrogations by the sensor system varies according to loading. Specifically, as more transponders enter the RF field, the number of times per second that a given transponder is located is reduced. This reduces the speed of the radio location system as a whole, but advantageously does not impede the ability of the system to detect or communicate with additional transponders 520.

Figure 15:
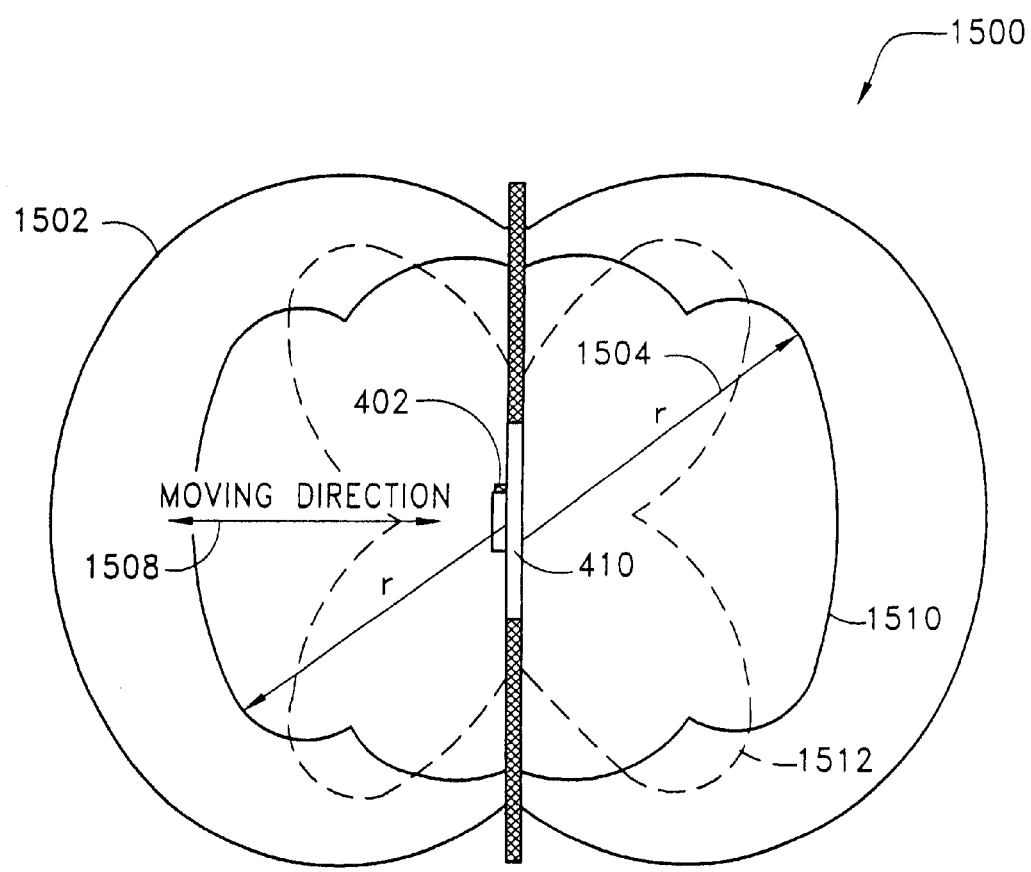
FIG. 15 is a plan view of the sensor array portion of the asset management and security system of the present invention in an exemplary installation, illustrating characteristic patterns of the transponder wake up range and sensor read range.

FIG. 15 is a plan view of a barrier (e.g., door 410) illustrating the characteristic sensitivity patterns 1500 of one exemplary installation of a sensor array 402 and sensor system 510 according to the present invention. Shown in FIG. 15 are (i) the maximum sensor read range 1502 (dependent on radiated frequency and power) for a three phase emitter; (ii) the maximum wake up range 1510 of the transponder 520 when the transponder antenna is parallel to the X axis (FIG. 1) of one emitter coil of the antenna array for the illustrated embodiment; and (iii) the maximum wake up range 1512 of the transponder 520 when the transponder antenna is perpendicular to the X axis (FIG. 1) of one emitter coil of antenna array 402 and only one coil is energized. The direction of movement of a hypothetical tagged asset moving through the door 410 is also shown by arrow 1508. Vector 1504 illustrates the maximum useful range achievable by the system 510, based on the overlap of the maximum wake up range and sensor array range. In the present embodiment, this range is approximately 6 m, although other distances may be used depending on the needs of the user and the specific application. Furthermore, it is contemplated that other sensitivity patterns may be created depending on such considerations.

Figure 16:
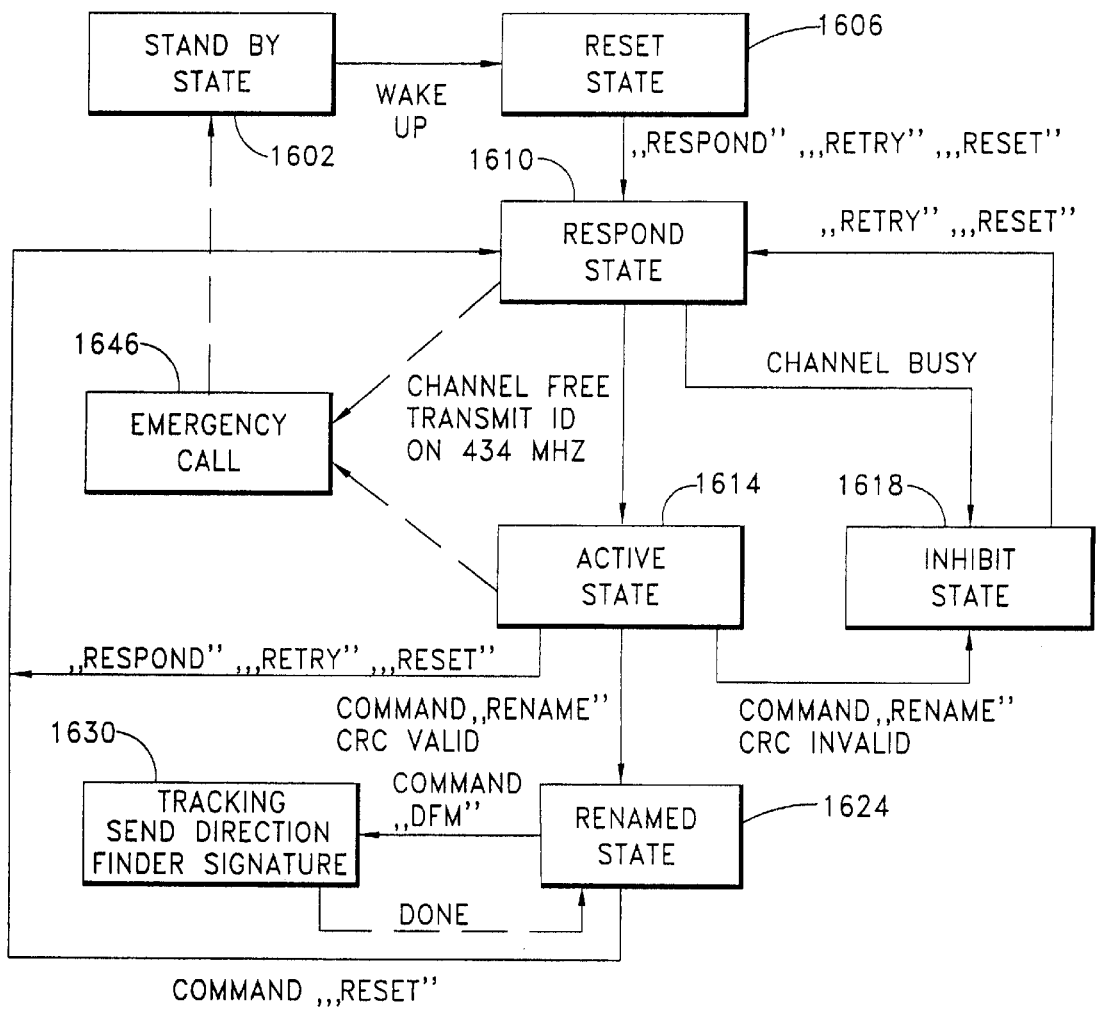
FIG. 16 is a logical state chart for the internal states of one embodiment of the transponder of FIG. 14.

FIG. 16 illustrates the various states of the transponder 520 of an exemplary embodiment of the present invention during operation of the system. As illustrated in FIG. 16, the transponder(s) 520 generally operates in one of seven states, namely: (i) the "stand by" state 1602; (ii) the "reset" state 1606; (iii) the "respond" state 1610; (iv) the "active" state 1614; (v) the "inhibit" state 1618; (vi) the "renamed" state 1624; and (vii) the direction finding mode (DFM) tracking pulse state 1630. These states and their inter-relationships are described below. It is noted that while discussed in terms of logical states, the operation of the transponder 520 as described herein is achieved using one or computer algorithms running on the microprocessor 1406 of the transponder, as well as the host computer processor or other intelligence associated with the sensor system 510. Such computer algorithms are ideally stored in the volatile and non-volatile memory devices (i.e., ROM, RAM, and magnetic storage media) incorporated within the transponder and sensor system, although other arrangements and storage schemes may be used.

In the stand by state 1602, electrical current consumption is reduced to minimum levels, and the transponder 520 waits for wake up signal. During this state, the microprocessor 1406 in the transponder is inactive. The transponder enters the reset state 1606 when the wake up signal 532 is received.

In the reset state 1606, the transponder is waiting for a transmission command to be issued by the sensor system 510. The wake up receiver circuit (FIG. 17) has seen a continuous signal for the minimum predetermined wake up time and activates the microprocessor 1406. The transponder waits for a "respond", "retry" or "reset" command before it sends its ID information to the sensor system 510 and enters the respond state 1610.

In the respond state 1610, the transponder sends its ID to the system 510. First, in one embodiment, a preamble (tag activity pulse, or TAP) is sent. The TAP informs the sensor system 510 that at least one transponder 520 is responding. A random number generator within the transponder processor 1406 selects one of eight time slots for transmission of the ID. The transmission of the actual ID starts at this randomly selected time slot. While waiting for this time slot, the transponder observes the signals emitted by the sensor system 510; as soon as a "channel free" signal disappears, the transponder stops to wait for transmission back to the sensor system and enters inhibit state 1618.

The ID message sent from the transponder 520 (i) informs the sensor system 510 the ID code of the tag which responded; (ii)and the status of the alarm bits in the tag.

In the inhibit state 1618, the transponder 520 waits for a "retry" command that offers the next chance to transmit, since the free 434 MHz channel was acquired by another transponder. The retry command returns the transponder to the respond state 1610 where the tag waits for another respond command.

A transponder that has sent its ID on the available 434 MHz channel without being inhibited enters the active state 1614. All commands issued by the sensor system 510 that are appropriate and should only be executed by a single, isolated transponder, are accepted in the active state 1614 only. In the illustrated embodiment, the only such command is the "rename" command (described below), although the use of other such commands is contemplated herein. While in active state 1614, the transponder 520 also receives an acknowledgement to its ID transmission. This acknowledgement contains, inter alia, a cyclic redundancy code (CRC) of the type well known in the signal processing arts, as well as the number of a time slot it has been allocated to use in direction finding mode (DFM) by the sensor system 510. The CRC is checked, and if valid, the transponder is commanded to enter the renamed state 1624. If the CRC is not valid, the transponder enters the inhibit state 1618 and awaits a "retry" command.

The Rename command send a message to only the recently responding tag. The tag is identified by using CRC code as a unique identifier. The command instructs the tag to use a predetermined time slot for all successive DFM commands.

In the renamed state 1624, the transponder 520 waits for the DFM initiation command from the sensor system 510 or, alternatively, a "reset" command. If the DFM initiation command is received, the transponder enters the DFM tracking pulse state 1630. If the "reset" command is received, the transponder is returned to the respond state 1610 as shown in FIG. 16.

In the DFM tracking pulse state 1630, the transponder first waits for the next DFM tracking command header, the header being used to synchronize all the tags being in DFM to the same time base. The DFM tracking command of the present embodiment comprises generally a DFM header field, tracking opcode (four bits), and a DFM group identification code (also four bits). The header synchronizes the transponder with the sensor system's bit clock (not shown), and provides a secure indication to the transponder that a new message is commencing. The opcode provides the transponder with instructions for the direction finding mode of operation. The DFM group is used to identify the transponder in the event that a large number of transponders are in use simultaneously.

When this next DFM command header is detected, the transponder waits for its DFM time slot (assigned via the "rename" command), and subsequently sends the DFM directional information to the sensor system 510. The transponder then returns to the renamed state 1624 and awaits further commands form the sensor system 510.

It is noted that the embodiment of the invention illustrated in FIG. 16 also includes an "emergency call" state 1646. In this state, the transponder 520 issues an emergency message to the sensor system 510 using the 434 MHz channel to alert the sensor system 510 of tampering or other predefined external digital input. The external input causes an interrupt into the tag which starts a predetermined message to be emitted at 434 MHz. This message follows the protocol used by all tags during the respond command.

Figure 17:
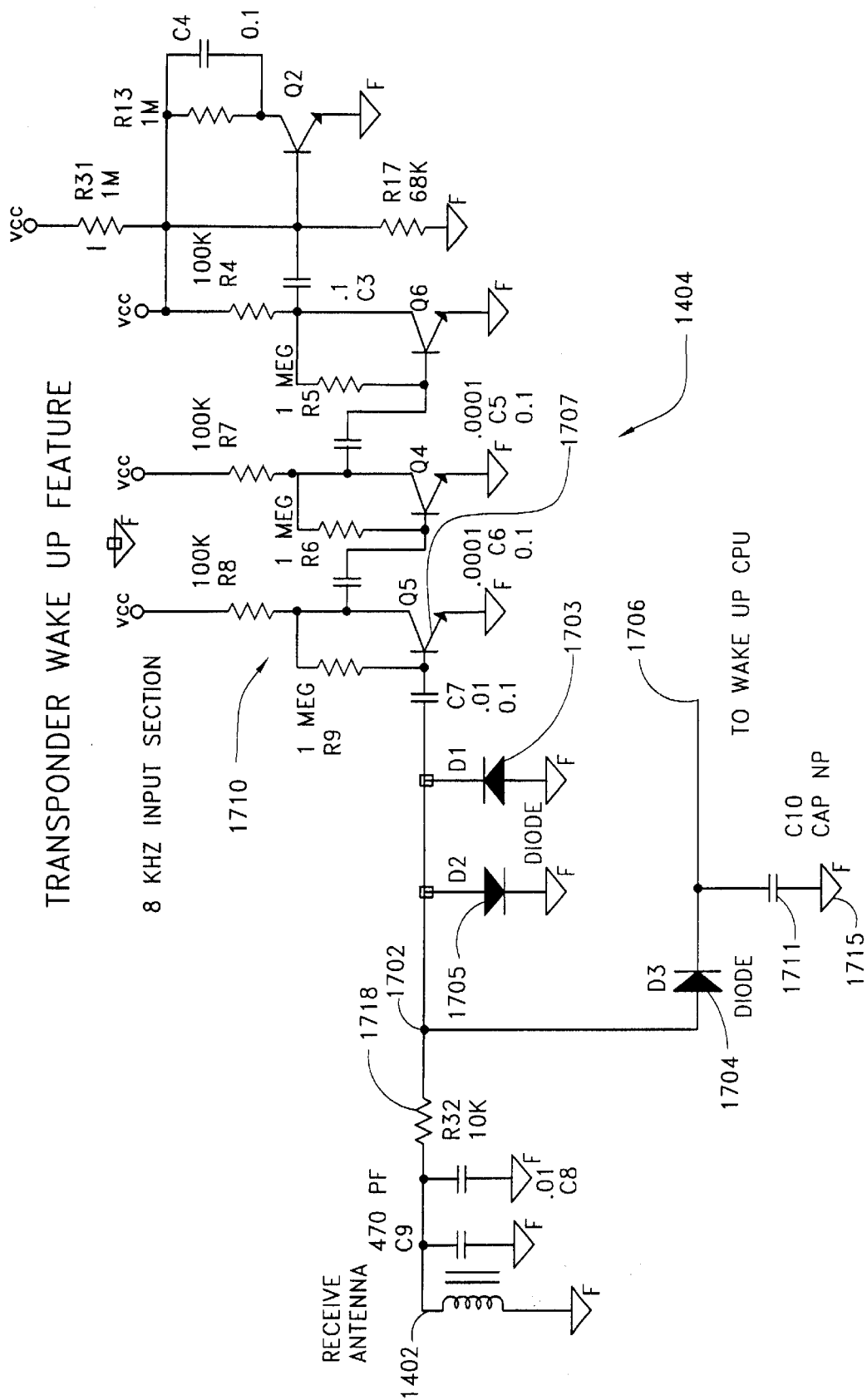
FIG. 17 is a schematic diagram of a portion of one embodiment of the transponder wake up circuit of the transponder of FIG. 14.

Referring now to FIG. 17, a schematic of one exemplary embodiment of the wake up circuitry 1404 of the transponder 1400 (FIG. 14) will be described. In one embodiment, the transponder 520 receives a signal at the receive antenna 1402 which is propagated to an 8 kHz input section 1710. A pair of diodes D1 1703 and D2 1705, acting as a symmetrical diode limiter, are added to stop overload of transistor Q5 1707 of the 8 kHz section 1710 due to the stronger input level of the wake up signal from a Portable Transponder Sensor. The anode of D2 1705 connects to point 1702 and the cathode connects to ground, while the cathode of D1 1703 connects to point 1702 and the anode connects to ground. In one embodiment of the transponder, the voltage induced by the wake up signal at point 1702 is about one volt. The anode of a diode D3 1704 connects to point 1702 and is used to generate a transponder wake up signal at point 1706. A capacitor C10 1711 connects between the cathode of D3 and ground 1715. In one embodiment, the voltage level of the transponder wake up signal at point 1706 is about 0.3 volts. A resistor R32 1718, having a value of 10,000 ohms in one embodiment, which is connected between the receive antenna 1402 and point 1702, is optional.

Elimination of Sensor Rejection by the Transponder

As previously described, the loop antenna of the transponder 520 is made from a magnetic coil based primarily on space considerations. The field pattern of the transponder coil antenna has a classical "donut" shape well known in the art. This donut pattern exhibits a three dimensional vector in opposite directions, whereby the transponder antenna can reject the signal from a sensor if the transponder is held in the proper orientation (i.e., such that the sensor field is aligned along the longitudinal axis of the donut). In the situation where the sensor system 510 comprises a "near" sensor and a "far" sensor (such as the "A" and "B" side sensor arrays shown in FIG. 4) when the transponder 520 is located on one side of the door 410 or the other, if the transponder is oriented such that the signal from the near sensor array 402 falls within the solid angle of rejection of the transponder loop antenna, the signal from that sensor could be attenuated by up to 30 dB. Since the sensor system determines position based at least in part on the relative strength of the signals received from the sensor arrays 402, the sensor system 510 may erroneously interpret the location information to indicate that the transponder is closer to the "far" sensor (i.e., the sensor on the opposite side of the door 410) rather than the near sensor.

To eliminate this type of error, the present invention creates conditions at the antenna of the transponder 520 such that the signal from the near sensor array cannot be rejected. Two techniques are utilized to achieve this result: (i) increasing the number of signals being coupled into the transponder; and (ii) turning off one of the orthogonal phases of the sensor array 402 in order to eliminate the "cancellation" effect. Each of these techniques is described in more detail below.

Increasing the number of signals being coupled to the transponder antenna is achieved by generating more than one signal at the sensor array 402, as previously described with respect to FIGS. 2–4. Each signal generated by the sensor array must have a different polarization. Since there are only three spatial dimensions, a signal polarized to each of these three dimensions (i.e., X, Y and Z) will account for all spatial orientations. As a result of more signals (each of which are on different polarizations in the environment of the transponder), the solid angle where the transponder 520 could possibly reject any one sensor array phase is dramatically reduced. However, as will be recognized by those of skill in the art, the coupling efficiency for any of these signals to the transponder antenna depends also on the orientation of the transponder antenna. Accordingly, additional methods are necessary to ensure that the transponder antenna can not reject the signal from all of the sensor array phases regardless of the transponder's orientation.

The foregoing limitation is addressed by the second technique employed by the present invention; namely, electrically "turning off" one of the three sensor array phases. Specifically, it will be recognized that if the transponder 520 is held in a position in space where the three signals from the nearest sensor array 402 are attenuated, then these signals are necessarily attenuated through a cancellation effect. The cancellation effect is caused by two signals coupling into the transponder coil, and a third signal also coupling in to the transponder coil, but in the opposite direction. Specifically, referring to FIG. 1, the current in a coil is related to the phase of the magnetic field generated by the current in accordance to Lenz's law. This is also known as the "right hand rule". Substituting the current in the wire with rotating vectors, then the vector sum of the currents induced into the loop in this example is as follows: when all three signals are turned on, then a current is induced into the coil from each of the three phases. The resultant vector is the vector sum of the three signals. It is possible for the vectors to combine such that the resultant vector is zero. For this to occur, the induced current must be equal for all three signals. If this is so, then when one signal is turned off, the vector sum can never be zero.

To eliminate this cancellation effect, one of the three loops of the rejected antenna array 402 is turned off using a conventional switching circuit (not shown) within the sensor system 510. Advantageously, the choice of the phase to be turned off is not critical, since the absence of field emitted by any one phase will effectively eliminate the cancellation effect at the transponder under any orientation of the latter. Since the rejected array will no longer be rejected (i.e., its signal will no longer be reduced in intensity by the up to 30 dB previously noted), it will be properly recognized by the transponder loop and correlated to a correct angular position by the processing algorithms previously described according to the relationship illustrated in Equation 2 and FIG. 3 herein.

Additionally, the present invention employs a unique message transmission protocol between the sensor system 510 and the transponder(s) 520. Specifically, the sensor system 510 transmits two messages from the antenna coils within its arrays 402. The first message is transmitted from all three phases of each sensor array 402, while the second is transmitted from only two of the three phases of each array. In this fashion, both of the messages emitted by the sensor arrays 402 can not be rejected by the transponder 520 regardless of its physical orientation with respect to the arrays, since the previously described "cancellation effect" is eliminated by turning one of the phases off. Stated differently, one of the two DFM messages transmitted by each sensor array 402 necessarily must be received by the transponder. Accordingly, each transponder 520 is kept in effectively constant communication with the sensor system 510. If the two DFM messages are transmitted in temporal sequence, the transponders 520 are in communication with the sensor system during at least one of the messages, thereby maintaining continuity (albeit having "dead" time corresponding to the rejected message transmission interposed therein). Furthermore, the two messages of the present DFM protocol are identical in content, so even if a transponder rejects one of the two messages, no data or other message content is lost.

Figure 18:
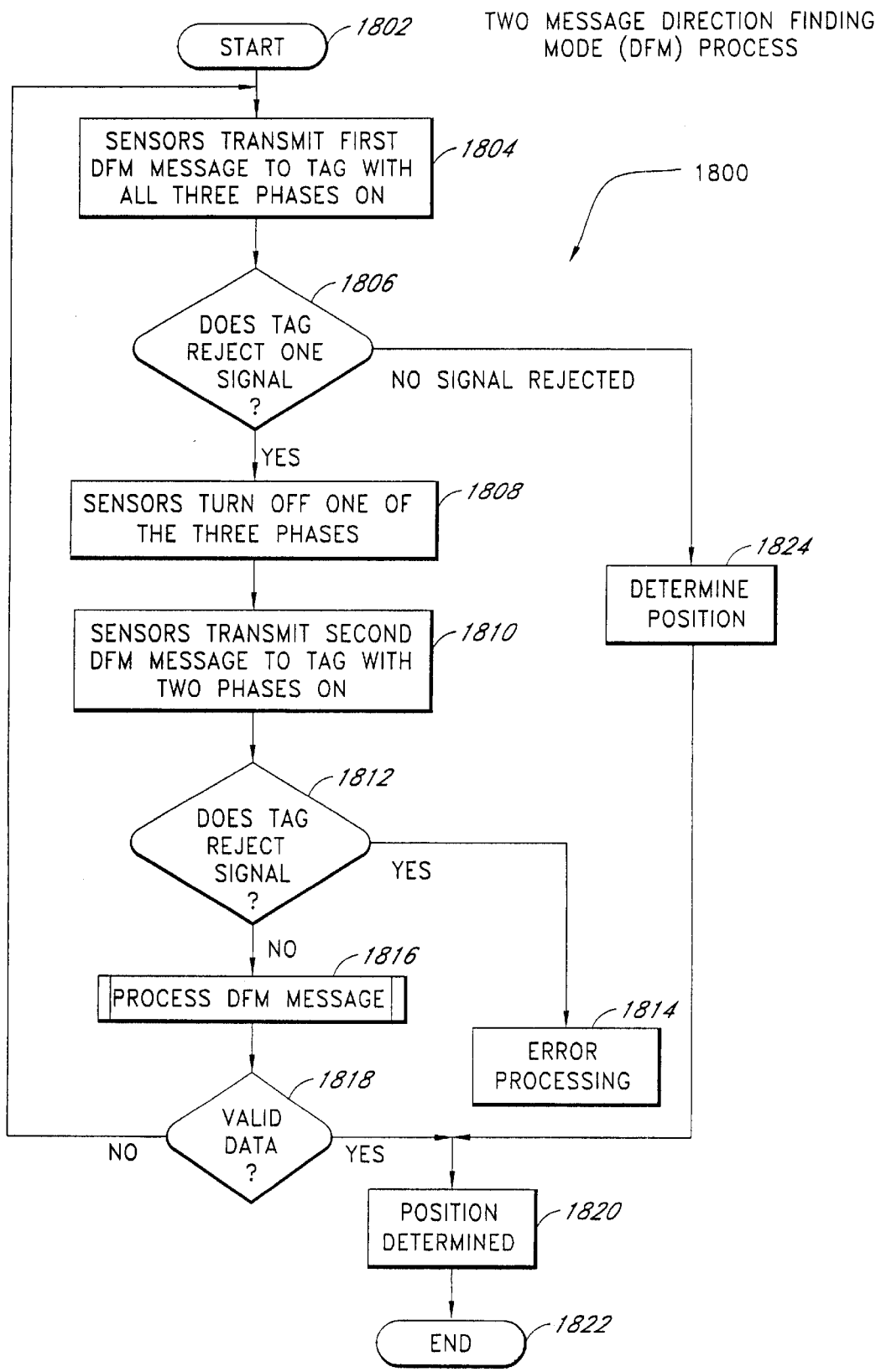
FIG. 18 is a logical flow chart illustrating one embodiment of the two message direction finding mode (DFM) process performed by the asset management system of the present invention.

Referring to FIG. 18, the aforementioned two message DFM method is now described in greater detail in terms of a preferred algorithm 1800 running on the transponder and sensor system processors. Beginning at a start state 1802, the algorithm 1800 moves to a transmit state 1804 where each of the sensors in the system transmits a first DFM message with all three antenna array phases being on. For example, in a system with an "A side" sensor array and a "B side" sensor array such as illustrated in FIG. 4 herein, both sensor arrays of each sensor pair would transmit the first DFM message. Proceeding next to a decision state 1806, the algorithm determines if the transponder rejects the signal from one of the sensor arrays. If so, the algorithm continues to another state 1808 and, in one embodiment, turns off one of the three phases at each sensor. In the illustrated embodiment, a phase is turned off by sending a command to the generator circuit 930 (FIG. 9), although other ways of turning off one of the phases are contemplated. Proceeding next to a second transmit state 1810, both of the sensor arrays of each pair transmit a second DFM message with one of the three phases turned off. The phase which is turned off can be any one of the three, as previously discussed. Moving to a decision state 1812, the algorithm 1800 again determines if the transponder rejects the signal. If so, in one embodiment, there is a system error (based on the fact that both the three-phase and two-phase DFM messages can not physically be rejected by the transponder), and the algorithm 1800 advances to an error processing state 1814 for analysis of the transponder(s) 520 rejecting the second signal. This state compares the DFM position information returned from the tag from the two messages. If the position information is different, the data is discarded and two more DFM messages are sent. However, if a transponder does not reject the second "two-phase" DFM signal, as determined at the decision state 1812, the algorithm 1800 processes the content of the second DFM message per function 1816.

In one embodiment, the DFM message processing function 1816 is implemented as a truth table. The two responses by each transponder to the two transmissions from the sensors are compared in the following exemplary truth table:

| First Response | Second Response | Conclusion |
| --- | --- | --- |
| A side | A side | transponder is in the A side |
| A side | B side | inconclusive |
| B side | B side | transponder is in the B side |
| B side | A side | inconclusive |

After the message processing function 1816 completes, the algorithm 1800 advances to a decision state 1818 and determines if the function 1816 yielded valid position data. If so, the algorithm moves to state 1820 to report the position of the transponder to the sensor system 510 via the transponder-to-sensor system communication 538 illustrated in FIG. 5. The algorithm 1800 then enters an end state 1822. If, however, it is determined at decision state 1818 that the position data is not valid, the algorithm 1800 moves back to the first transmit state 1804 to begin the process again so as to try to obtain valid position data.

It is noted that if it is determined in decision state 1806 that none of the signals are rejected by the transponder, the algorithm 1800 advances to state 1824. At state 1824, the strongest signal of the signals received at the transponder antenna is determined, and the algorithm selects the strongest signal as indicative of the sensor that the transponder is closest to in location. Alternatively, the transponder measures the relative signal strengths of those signals received and develops an estimate of the relative angular position as previously described with respect to FIG. 3.

Direction Finding Method

Figure 19:
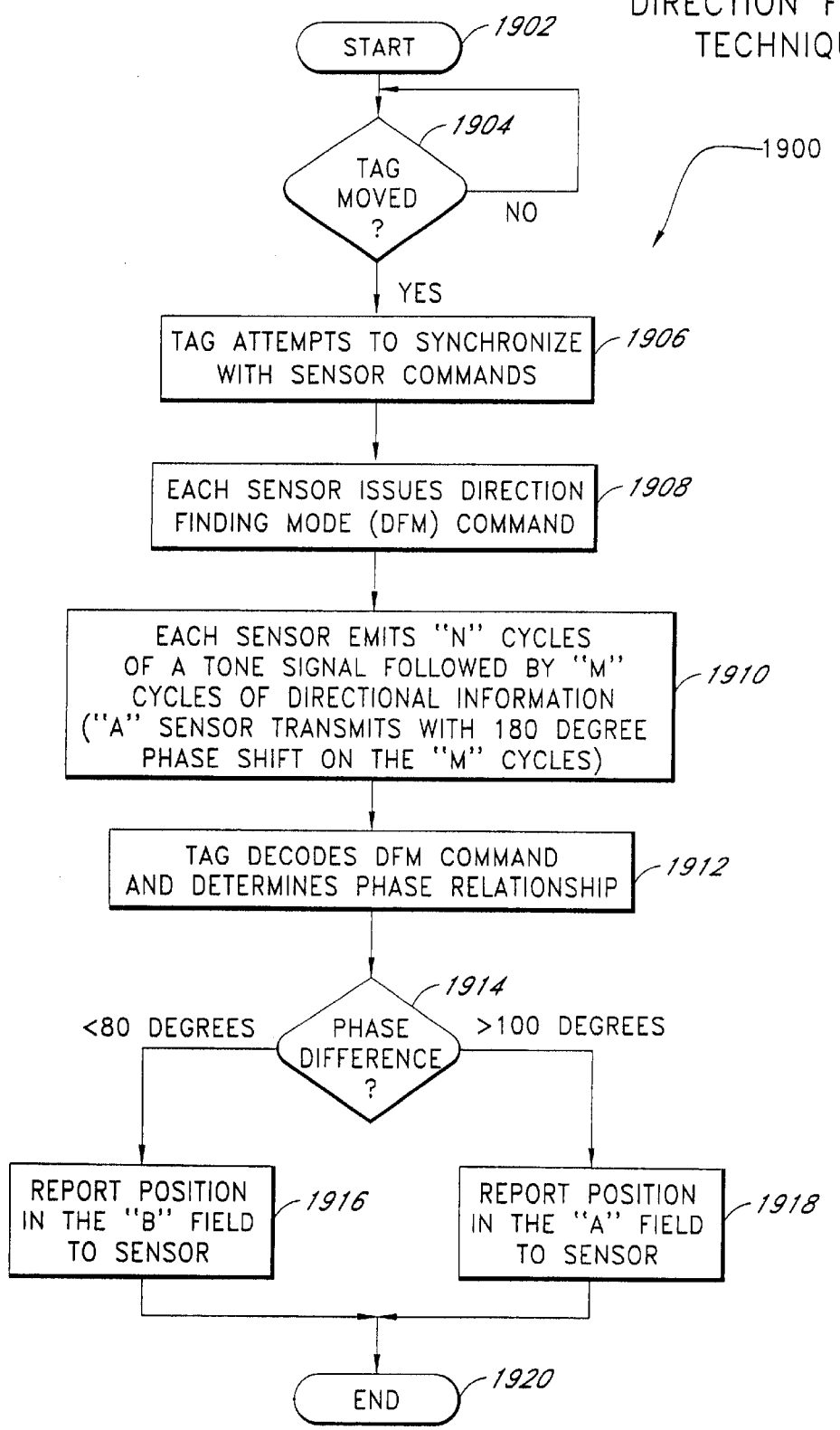
FIG. 19 is a logical flow chart of one embodiment of the position location technique utilized by the asset management system of the present invention.

FIG. 19 illustrates the direction finding method of the present invention in greater detail. This method 1900 determines the position of the tag or transponder in relation to the multiple system sensor arrays 402 disposed around an access point such as a door 410 (FIG. 4). Beginning at a start state 1902, the method employs a first decision state 1604 to determine if the transponder 520 is in motion. Recall that the transponder contains a motion sensor 1411 which enables the "wake up" of the transponder processor if the transponder is both in motion (over a given time interval) and within an RF field of a predetermined intensity. If the transponder is not in motion or the field not present, the method 1900 is terminated until it is determined that foregoing conditions are met. When these conditions are satisfied, the transponder attempts to synchronize with the commands being issued by the sensor arrays 402 in state 1906. Eventually, each of the sensor arrays of the sensor system 510 issues a Direction Finding Mode (DFM) command at state 1908. In one embodiment of the invention, after the DFM command is issued, each of the sensors emits a plurality (e.g., thirty-two) cycles of an 8130 Hz signal, followed by a lesser number (e.g., nine) cycles of directional information at state 1910. It will be recognized that the sensor may emit a signal at another frequency or frequencies if desired. During the nine cycles of directional information, the "A" sensor array of the sensor pair transmits the nine cycles with a 180 degree phase shift, while the "B" sensor does not phase shift the 8130 Hz signal. For the purposes of this discussion, a phase shift is accomplished by shifting a given number of cycles of an RF signal with respect to a center or "normal" frequency. Thus, the signals from the "A" and the "B" sensor arrays are phase shifted by 180 degrees from each other during the period of the nine cycles.

In state 1912 of the method 1900, the receiving transponder waits until the aforementioned nine cycle period and compares the received signal from sensor "A" with the received signal from sensor "B". This comparison yields an indication of which of the two sensor arrays 402 (i.e., either the "A" array or the "B" array) is closer to the transponder. In one embodiment, this comparison is performed by rationing the relative signal strengths of the signals from the two sensors arrays as previously described with respect to FIG. 3. If the relative phase difference is 80 degrees or less, the transponder believes it is closer to the "B" sensor field; that is, on the "B" side of the door 410 of FIG. 4. However, if it is determined at the decision state 1914 that the phase difference is greater than 100 degrees, then the transponder believes it is on the "A" side of the door. The transponder reports its position to the sensors system 510 accordingly in state 1916 (for the "B" side of the door 410) or state 1918 (for the "A" side of the door 410), and the process completes at an end state 1920.

It will be recognized that while phase shifts of 80 and 100 degrees are used as decision criteria in the present embodiment, other decision criteria and in fact other approaches may be used to determine to which of the sensor arrays the transponder 520 is closer.

Dormant RFID Transponder Communication System

Figure 20:
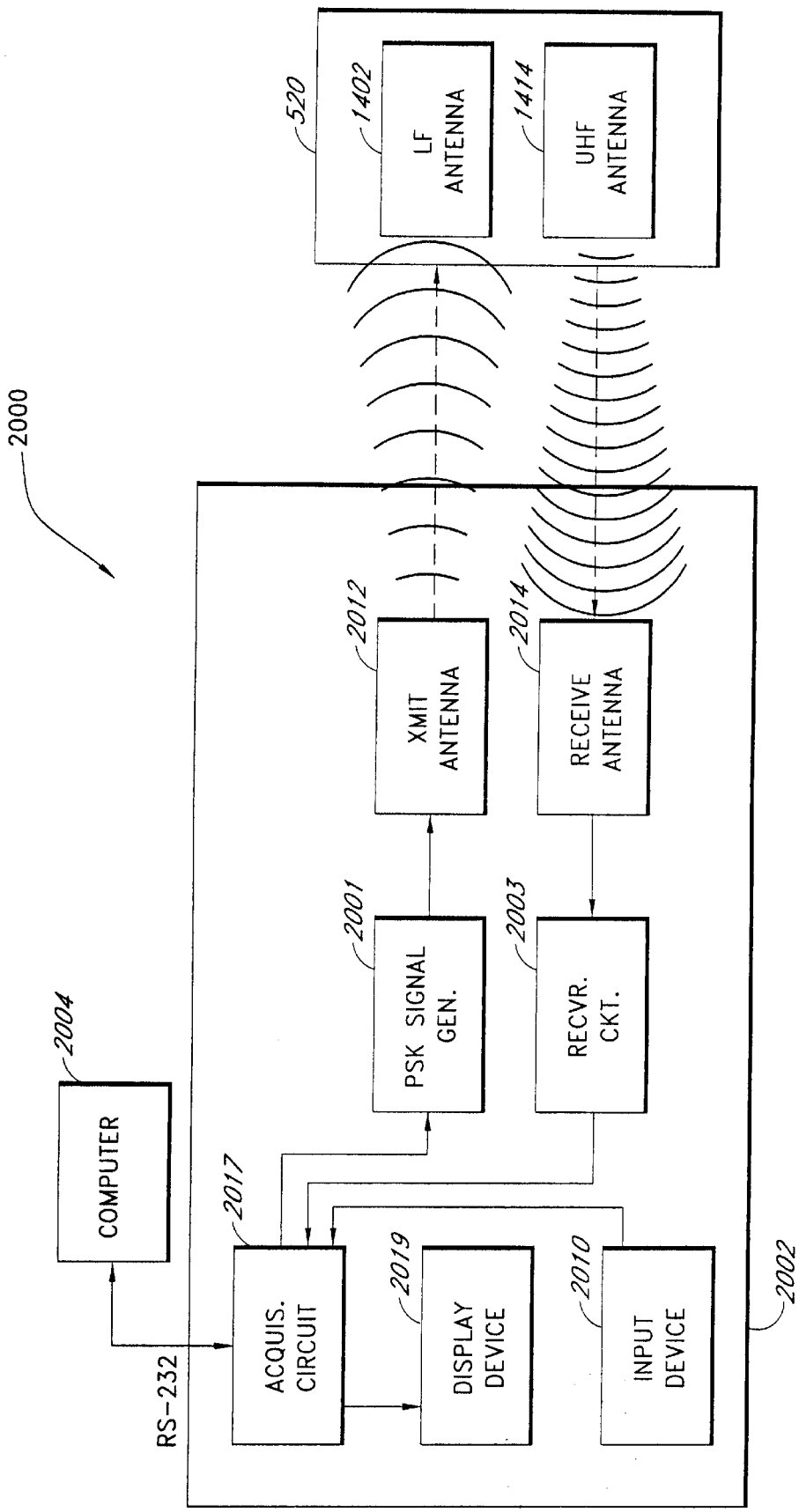
FIG. 20 is a block diagram of one embodiment of the portable wake up sensor probe and system according to the present invention.

Referring now to FIG. 20, a system and method for communicating with a dormant RFID transponder is now described. In the embodiment of FIG. 20, the dormant transponder communication system 2000 comprises a portable transponder sensor (PTS) 2002 which is advantageously attached to a laptop or other portable computer 2004. It will be recognized that other electronic computing devices, such as palmtop organizers, calculators, or even non-portable devices may be substituted for the illustrated laptop computer 2004 if desired. The system is used to associate the tagged asset to the transponder 520, and once associated, the transponder 520 can be checked on a routine or maintenance schedule without having to activate the motion detector 1411 or other sensor within the transponder.

The system 2000 of the illustrated embodiment is capable of bi-directional communication with one or more transponders 520, and allows the user to perform maintenance and inventory control functions associated therewith. The PTS 2002 includes a processor (not shown), an on-board phase shift keying (PSK) signal generator 2001, and a 434 MHz receiver section 2003, for generating commands and decoding F/2F data, such as non-return-to-zero coded data, which is received from the transponder(s) 520. The processor may alternatively or simultaneously comprise the host processor of the computer 2004. All of the transmit and receive antennas 2012, 2014 are mounted within the PTS 2002 for compactness and ease of use. The PTS 2002 is capable of generating a magnetic field of great enough intensity to allow for the dormant transponder 520 (such as a transponder having a motion sensor which is not in motion) to wake up when the PTS 2002 is placed in relative proximity to the transponder 520. In the illustrated embodiment, the PTS 2002 generates a field with intensity on the order of one Gauss, although other field intensities may be used.

The acquisition portion 2017 of the PTS 520 receives commands, and downloads data to the laptop computer 2004 via a standard RS-232 serial data link of the type well know in the data processing arts, although others (such as USB, wireless, or infrared/optical coupling, for example) may be readily used. The laptop 2004 of the illustrated embodiment has a Windows®-based interface with appropriate screens and menu structures that direct or allow the operator to perform various desired functions relating to the transponder 520 or PTS 2002.

The PTS 2002 of the embodiment of FIG. 20 comprises generally a hand held wand having an LCD screen 2019 (with back lighting) capable of displaying information relating to operation of the system 2000 and the transponder 2002. The PTS 2002 further comprises an input device 2010 such as a series of keys or pushbuttons on its outer surface which permit the operator to accomplish a variety of data input and preprogrammed functions. A variable menu structure is also optionally used, whereby individual keys of the input device 2010 may be used to perform multiple functions. It will be recognized that while the illustrated embodiment uses a key/menu arrangement and LCD screen for information display and input, other configurations such as a touch-sensitive screen (with or without stylus), cathode ray tube, or thin film transformer (TFT) or plasma display may be used with equal success.

The PTS 2002 of FIG. 20 is further capable of changing the modes or states of the transponder 520 with which it is in communication, such as from "normal" to "transport" mode or vice versa. Normal mode is a state whereby the tag behaves as previously described. Note that the tag must be moved so that the accelerometer will wake up the microprocessor. However, this state is wasteful of battery life if the tag has not yet been installed, or is in transport and is constantly being shaken. "Transport mode" is a state where the tag does not use the signal from the accelerometer and so the tag enjoys a longer battery shelf life.

In another aspect of the invention, the PTS 2002 is able to receive tamper alert messages from the transponder 520 in an unsynchronized fashion; these alert messages are generated within the transponder by the processor 1406 when the transponder is tampered with. Specifically, the tamper detector 1410 provides a signal to the processor 1406 when the detector is activated (such as by someone trying to remove the transponder from the asset). These signals may be stored by the transponder for later retrieval by the PTS 2002, or directly converted to a radio frequency message emitted by the transponder and received by the PTS when the transponder is tampered. Information received by the PTS 2002 further includes, inter alia, the ID of the tampered with transponder.

While the above detailed description has shown, described, and pointed out fundamental novel features of the invention as applied to various embodiments, it will be understood that various omissions, substitutions, permutations, and changes in the form and details of the apparatus and methods illustrated may be made by those skilled in the art without departing from the spirit of the invention. The foregoing description is not in any way meant to limit the scope of the invention; rather such scope is determined by the claims appended hereto.

What is claimed is:

1. A method of maintaining continuous communication between a transceiver and a radio frequency identification (RFID) transponder having an antenna coil, said transceiver having a plurality of antenna coils oriented in a first spatial relationship to each other, the method comprising:

positioning said transponder in relative proximity to said transceiver, said transponder being oriented in a second spatial relationship with respect to said plurality of antenna coils of said transceiver;

concurrently transmitting a first signal according to a first protocol from each of said plurality of antenna coils of said transceiver; and concurrently transmitting a second signal according to said first protocol from a subset of said plurality of antenna coils of said transceiver;

wherein said first and second spatial relationships are such that either or both of said first signal and said second signal are at least partially coupled to said antenna coil of said transponder.

2. The method of claim 1, wherein the acts of transmitting a first signal and transmitting a second signal are temporally sequential.

3. The method of claim 1, wherein the act of transmitting said first and second signals includes transmitting at least one cyclic redundancy code (CRC).

4. The method of claim 1, wherein the act of transmitting said signals from each of said antenna coils of a given transceiver further comprises shifting said signals in electrical phase with respect to the signals transmitted by the other antenna coils associated with that same transceiver.

5. The method of claim 4, wherein said transceiver comprises three antenna coils, and the act of shifting comprises shifting each signal in electrical phase by 120 degrees.

6. The method of claim 5, wherein said three antenna coils of said given transceiver are orthogonal to each other.

7. A method of determining the position of a radio frequency identification (RFID) transponder with respect to a transceiver, said transponder having an antenna coil configured to receive a radio frequency signal, said transceiver having a first sensor and a second sensor in different locations, said first and second sensors further including a plurality of antenna coils oriented in a first spatial relationship to each other, the method comprising:

positioning said transponder in a second spatial relationship with respect to said first and second sensors;

concurrently transmitting a first signal from each of said plurality of antenna coils of said first and second sensors;

concurrently transmitting a second signal from a subset of said plurality of antenna coils of said first and second sensors; and determining the position of said transponder relative to said first and second sensors based on said first and second signals received by said antenna coil of said transponder.

8. The method of claim 7, wherein the act of transmitting said first and second signals from each of said antenna coils of said sensors further comprises shifting each of said signals in electrical phase from the others within each sensor.

9. The method of claim 7, wherein a one of the sensors is located nearer the transponder than the other sensor.

10. The method of claim 7, wherein the act of transmitting from a sensor comprises transmitting from three antenna coils, each of which are spatially orthogonal to one another.

11. The method of claim 10, wherein the act of transmitting said second signal comprises transmitting signals from two of the antenna coils of said sensors.

12. The method defined in claim 7, wherein the act of determining the position of the transponder comprises comparing the relative field strengths of said first and second sensors.

13. A radio frequency communication system, comprising:

a first transceiver capable of transmitting a radio frequency signal, said first transceiver having a plurality of antenna coils disposed in different spatial orientations each of which may transmit the radio frequency signal; and a second transceiver having a directional antenna coil;

wherein said first transceiver is operated so as to selectively concurrently transmit from either all or a subset of said plurality of antenna coils in order to at least partly couple to said directional antenna coil regardless of said directional antenna coil's orientation with respect to said transceiver.

* * * * *